(12) United States Patent
Takasugi

(10) Patent No.: US 7,372,989 B2
(45) Date of Patent: May 13, 2008

(54) COLOR MISREGISTRATION REDUCER

(75) Inventor: Kei Takasugi, Hino (JP)

(73) Assignee: Olympus Corporation, Tokyo (JP)

( * ) Notice: Subject to any disclaimer, the term of this patent is extended or adjusted under 35 U.S.C. 154(b) by 833 days.

(21) Appl. No.: 10/499,892

(22) PCT Filed: May 16, 2003

(86) PCT No.: PCT/JP03/06100

§ 371 (c)(1),
(2), (4) Date: Jun. 23, 2004

(87) PCT Pub. No.: WO03/096887

PCT Pub. Date: Nov. 27, 2003

(65) Prior Publication Data

US 2005/0046695 A1    Mar. 3, 2005

(30) Foreign Application Priority Data

May 16, 2002    (JP)    ............................. 2002-142094

(51) Int. Cl.
*G06K 9/00* (2006.01)
*H04N 9/47* (2006.01)
*G06K 9/40* (2006.01)

(52) U.S. Cl. ........................................ 382/162; 348/71

(58) Field of Classification Search ................ 382/162, 382/164, 166–168, 172, 219, 264, 272, 276, 382/284; 348/65, 66, 70–72, 263, 269, 576, 348/649, E9.007; 345/589, 600–604; 358/1.9, 358/514, 515, 518
See application file for complete search history.

(56) References Cited

U.S. PATENT DOCUMENTS

| 5,333,010 A | 7/1994 | Nakamura et al. |
|---|---|---|
| 5,485,203 A | 1/1996 | Nakamura et al. |
| 5,675,378 A | 10/1997 | Takasugi et al. |
| 6,198,550 B1 * | 3/2001 | Toyoda ........................ 358/514 |
| 6,208,351 B1 * | 3/2001 | Borg et al. .................. 345/600 |
| 6,529,616 B1 * | 3/2003 | Rasmussen et al. ......... 382/112 |
| 6,859,228 B1 * | 2/2005 | Chang et al. ................ 348/263 |
| 7,256,910 B2 * | 8/2007 | Lee .............................. 358/1.9 |
| 2001/0033686 A1 * | 10/2001 | Klassen ...................... 382/167 |

(Continued)

FOREIGN PATENT DOCUMENTS

JP    3-270392    12/1991

(Continued)

*Primary Examiner*—Amir Alavi
(74) *Attorney, Agent, or Firm*—Scully, Scott, Murphy & Presser, P.C.

(57) ABSTRACT

A color shift reducing apparatus includes: a color shift area detecting unit for detecting a color shift area on the basis of input image data and image data delayed through a memory; a color shift degree calculating unit for calculating data indicating the degree of color shift on the basis of a color shift detection signal, the input image data, and the image data delayed by one field through the memory; an image data estimating unit for estimating image data on the basis of the color shift detection signal, the input image data, and the image data supplied from the memory; and a color shift reducing unit for forming a color shift reduced image on the basis of the image data supplied from the memory, estimated image data, and the color shift degree data.

5 Claims, 21 Drawing Sheets

U.S. PATENT DOCUMENTS

2002/0141003 A1* 10/2002 Chang et al. ............... 358/518
2005/0046695 A1* 3/2005 Takasugi .................... 348/71

FOREIGN PATENT DOCUMENTS

| | | |
|---|---|---|
| JP | 6-319694 | 11/1994 |
| JP | 6-327621 | 11/1994 |
| JP | 6-327622 | 11/1994 |
| JP | 9-74570 | 3/1997 |

* cited by examiner

COLOR MISREGISTRATION REDUCER

This Application is a 371 of PCT/JP03/06100 May 16, 2003.

TECHNICAL FIELD

The present invention relates to a color shift reducing apparatus for reducing color shift in color video signals derived from a field-sequential imaging device.

BACKGROUND ART

In general, an electronic endoscope includes imaging means such as an imaging device for applying illumination light of R (red), G (green), and B (blue) with various wavelengths to a subject in a time series manner and then photoelectrically converting light reflected by the subject into video signals using a solid-state image sensor such as a charge coupled device (CCD). This type of imaging device has the following disadvantage: When the subject moves fast, three color component signals obtained in time series are shifted. In other words, color shift occurs.

To reduce color shift, color shift reducing apparatuses for receiving color video signals from a field-sequential imaging device and reducing color shift of the color video signals have been proposed.

The color shift reducing apparatuses include a color shift reducing apparatus for applying a mean color component of the whole of an image with color shift to a color shift part, thus correcting the color shift, and a color shift reducing apparatus for forming a correction color using a brightness component and color components of an image and then applying the correction color to a color shift part, thus correcting the color shift as disclosed in Japanese Unexamined Patent Application Publication No. 3-270392.

Japanese Unexamined Patent Application Publication No. 6-319694 discloses an apparatus for extracting the highest pixel frequency value from a color distribution histogram and assigning a color having the highest pixel frequency value as an estimated color to a color shift area, thus correcting color shift.

In addition, Japanese Unexamined Patent Application Publication No. 9-74570 discloses a color shift correcting apparatus for changing the combination ratio of an original image and a color shift corrected image in response to the conditions of the image to form a color shift reduced image. The apparatus can correct an image derived on undesirable processing conditions, for example, upon bleeding or spreading a stain., thus forming a natural color shift reduced image.

In each of the above-mentioned conventional color shift reducing apparatuses, however, each algorithm is established on the precondition that one pigment exists in a living body. Disadvantageously, when blood comes out a mucous membrane sprayed with a stain, namely, two or more pigments exist in a living body, the color of the strain is corrected using the same color as that of the blood, alternatively, the color of the blood is corrected using the same color as that of the strain. When a fixed color is assigned to a color shift portion, the portion is corrected using an achromatic color.

The present invention is made in consideration of the above circumstances. An object of the present invention is to provide a color shift reducing apparatus capable of accurately estimating a correction color when two or more pigments exist in a living body.

Another object of the present invention is to provide a color shift reducing apparatus capable of favorably performing a color shift reducing process to a dark image having low color saturation.

DISCLOSURE OF INVENTION

The present invention provides a color shift reducing apparatus including: a color shift area detecting unit for detecting an area with color shift in a first image on the basis of a first image signal indicating the first image and a second image signal indicating a second image, the first and second images being obtained by imaging a subject through a field-sequential imaging device; a color component signal estimating unit for estimating a color component signal on the basis of the other color component signals included in an area of the first image signal, the area excluding the color shift area detected through the color shift area detecting unit, the other color component signals being first and second color component signals, the color component signal being a third color component signal; and a color shift reducing unit for forming a color shift reduced image on the basis of the first image signal and image signals based on the first and second color component signals and the third color component signal which is obtained through the color component signal estimating unit.

Other features and advantages of the invention will appear more fully apparent from the following description.

BEST MODE FOR CARRYING OUT THE INVENTION

The present invention will now be described in detail with reference to the appended drawings.

First Embodiment

Figure 1:
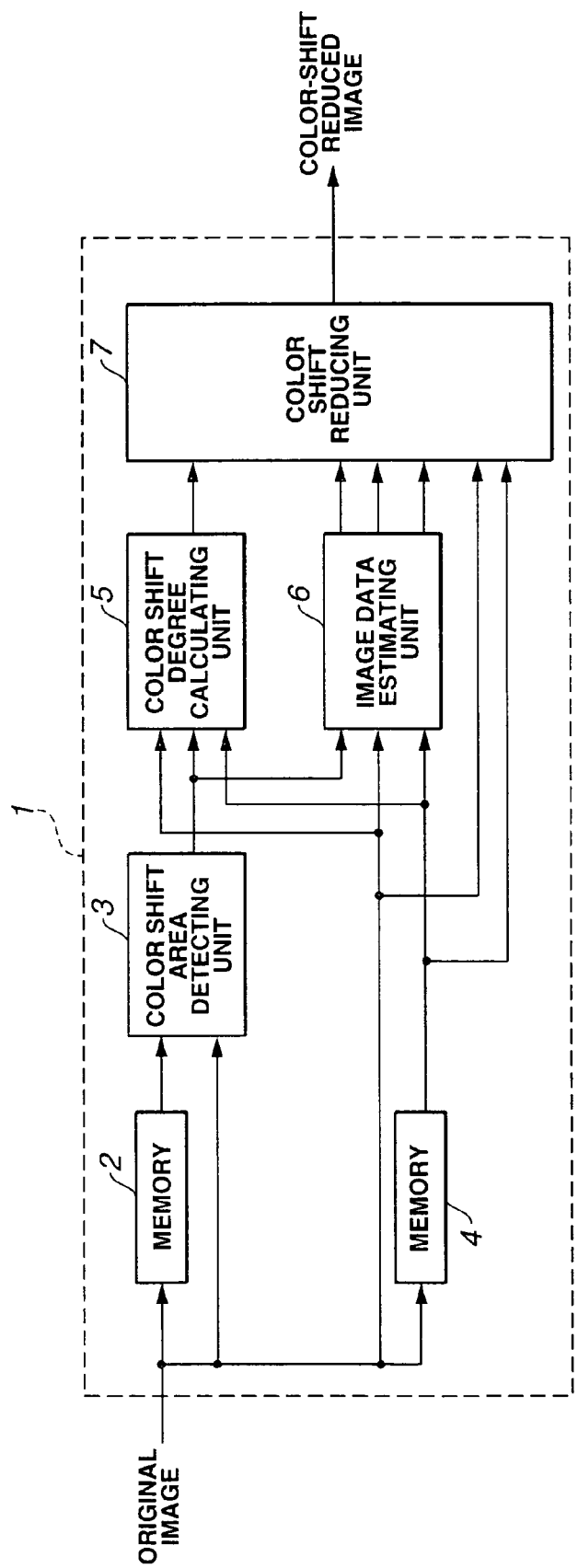
FIGS. 1 to 10 relate to a first embodiment of the present invention, FIG. 1 being a block diagram of the fundamental structure of a color shift reducing apparatus, FIG. 2 being a block diagram of the structure of a color shift area detecting unit in FIG. 1, FIG. 3 being a block diagram of the structure of a color shift degree calculating unit in FIG. 1, FIG. 4 being a block diagram of the structure of an image data estimating unit in FIG. 1, FIG. 5 being a block diagram of the structure of a color shift reducing unit in FIG. 1, FIG. 6 being a flowchart of the color shift detecting operation performed by the color shift area detecting unit in FIG. 1, FIG. 7 showing an RGB color space divided into 8×8×8 blocks, the space being used in the operation of FIG. 6, FIG. 8 being a flowchart of a first process of writing estimated color data based on input image data to LUTs, the process being performed by the image data estimating unit in FIG. 1, FIG. 9 being a flowchart of a second process of writing estimated color data based on input image data to the LUTs, the process being performed by the image data estimating unit in FIG. 1, FIG. 10 showing an example of a color shift degree conversion graph used in the process of FIG. 9.

Referring to FIG. 1, a color shift reducing apparatus 1 comprises: a memory 2 for delaying an input image signal; a color shift area detecting unit 3 for detecting an area in which color shift occurs on the basis of input image data and image data delayed through the memory 2; a memory 4 for delaying the input image data by one field; a color shift degree calculating unit 5 for calculating data indicating the degree of color shift on the basis of a color shift detection signal output from the color shift area detecting unit 3, the input image data, and the image data delayed through the memory 4; an image data estimating unit 6 for estimating image data on the basis of the color shift detection signal output from the color shift area detecting unit 3, the input image data, and the image data delayed through the memory 4; and a color shift reducing unit 7 for forming a color shift reduced image on the basis of the image data output from the memory 4, estimated image data output from the image data estimating unit 6, and the color shift degree data output from the color shift degree calculating unit 5, and then outputting the formed image.

Figure 2:
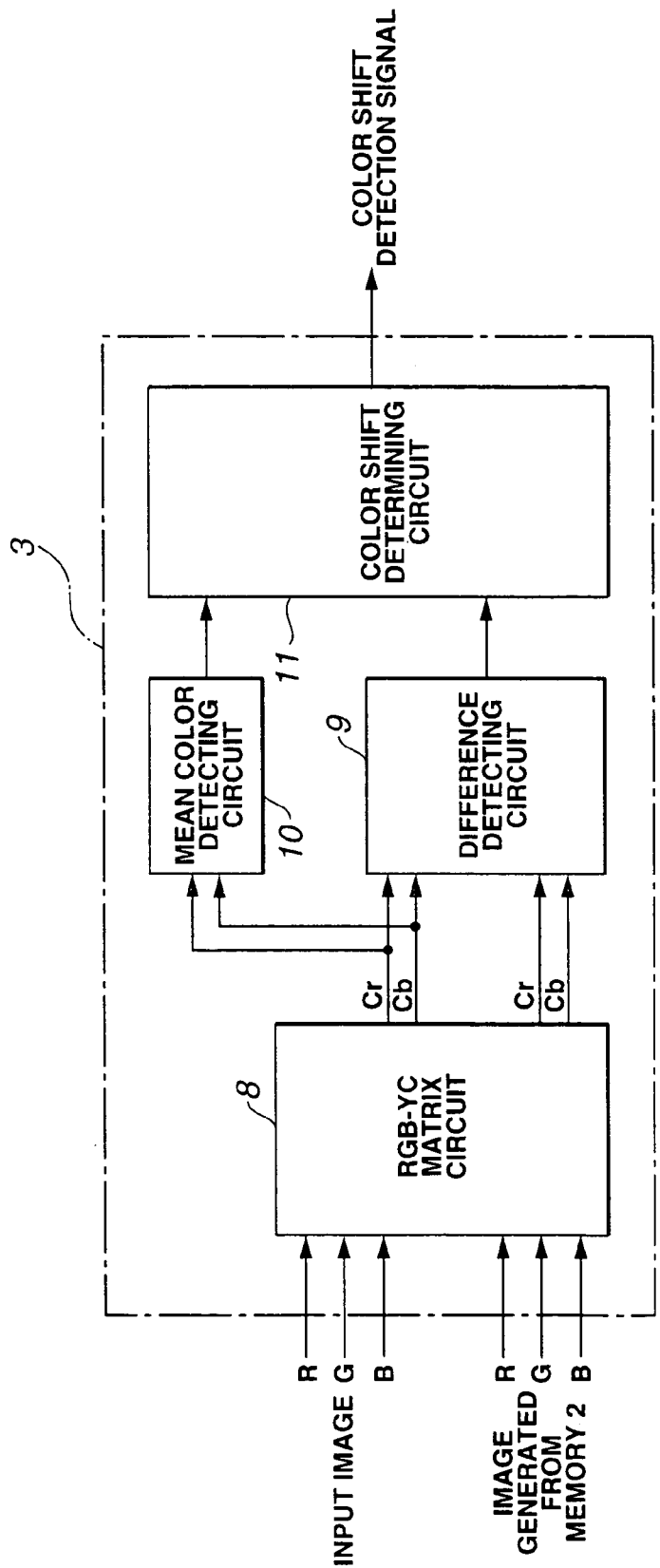

Referring to FIG. 2, the color shift area detecting unit 3 comprises: an RGB-YC matrix circuit 8 for calculating color signals Cr and Cb from input RGB image data and those of image data delayed through the memory 2, and then generating the color signals; a difference detecting circuit 9 for calculating a difference between the color signal Cr of the input image data and that of the delayed image data and a difference between the color signal Cb of the input image data and that of the delayed image data to detect a change of a predetermined value or larger on the basis of the differences; a mean color detecting circuit 10 for calculating a mean color of the input image on the basis of the color signals Cr and Cb of the input image data and then detecting the mean color; and a color shift determining circuit 11 for determining color shift on the basis of an output signal of the difference detecting circuit 9 and that of the mean color detecting circuit 10.

Figure 3:
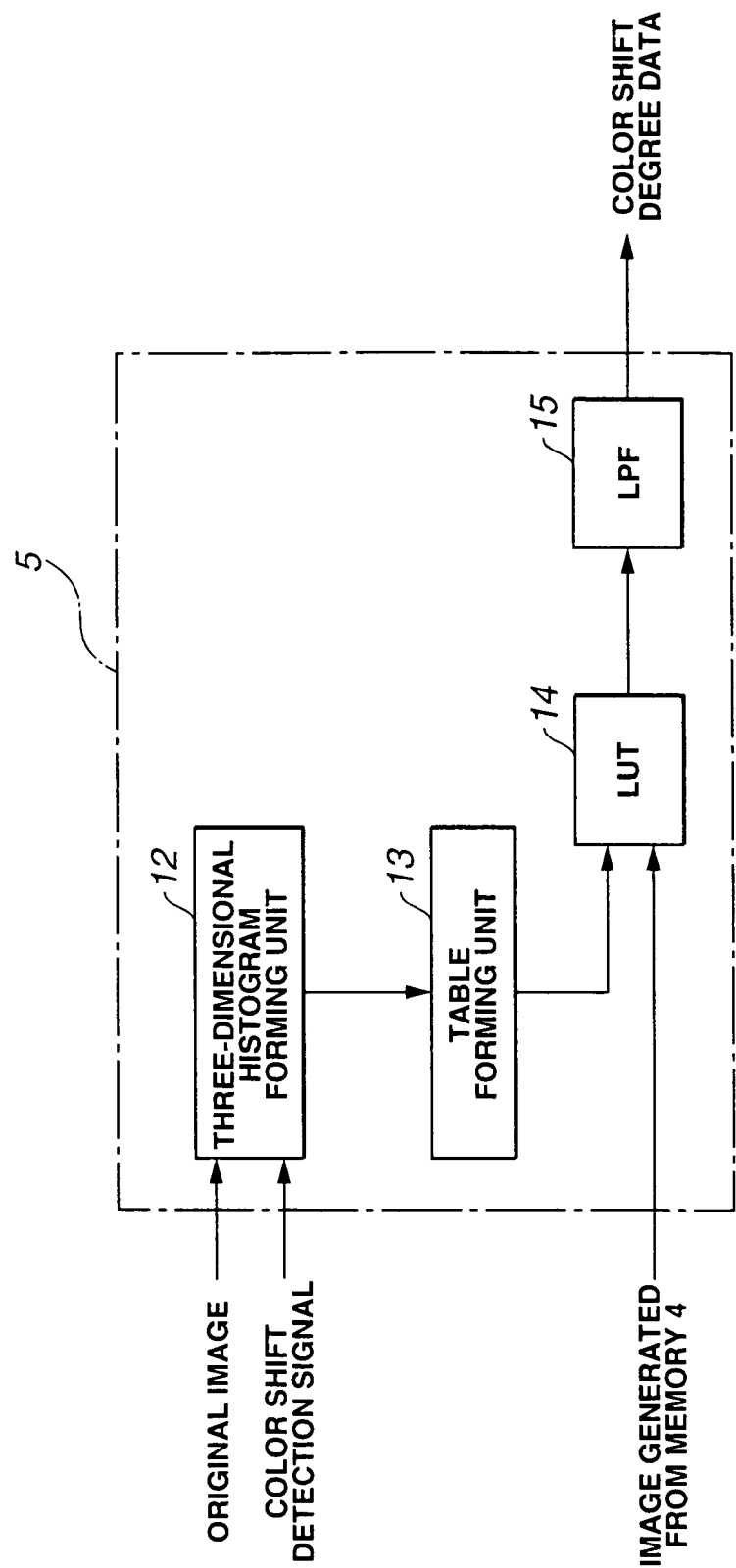

Referring to FIG. 3, the color shift degree calculating unit 5 comprises: a histogram forming unit 12 for forming a three-dimensional histogram on the basis of the input RGB image data and a color shift detection signal generated from the color shift area detecting unit 3; a table forming unit 13 for writing table data for calculation of the degree of color shift in a look-up table (hereinbelow, referred to as an LUT) 14 with reference to the three-dimensional histogram formed by the histogram forming unit 12; the LUT 14 for outputting data indicating the degree of color shift on the basis of image data which is output from the memory 4 and is delayed by one field; and a low-pass filter (hereinbelow, referred to as an LPF) 15 for performing a process of blurring the boundary between a color shift area and an area with no color shift to the color shift degree data output from the LUT 14.

Figure 4:
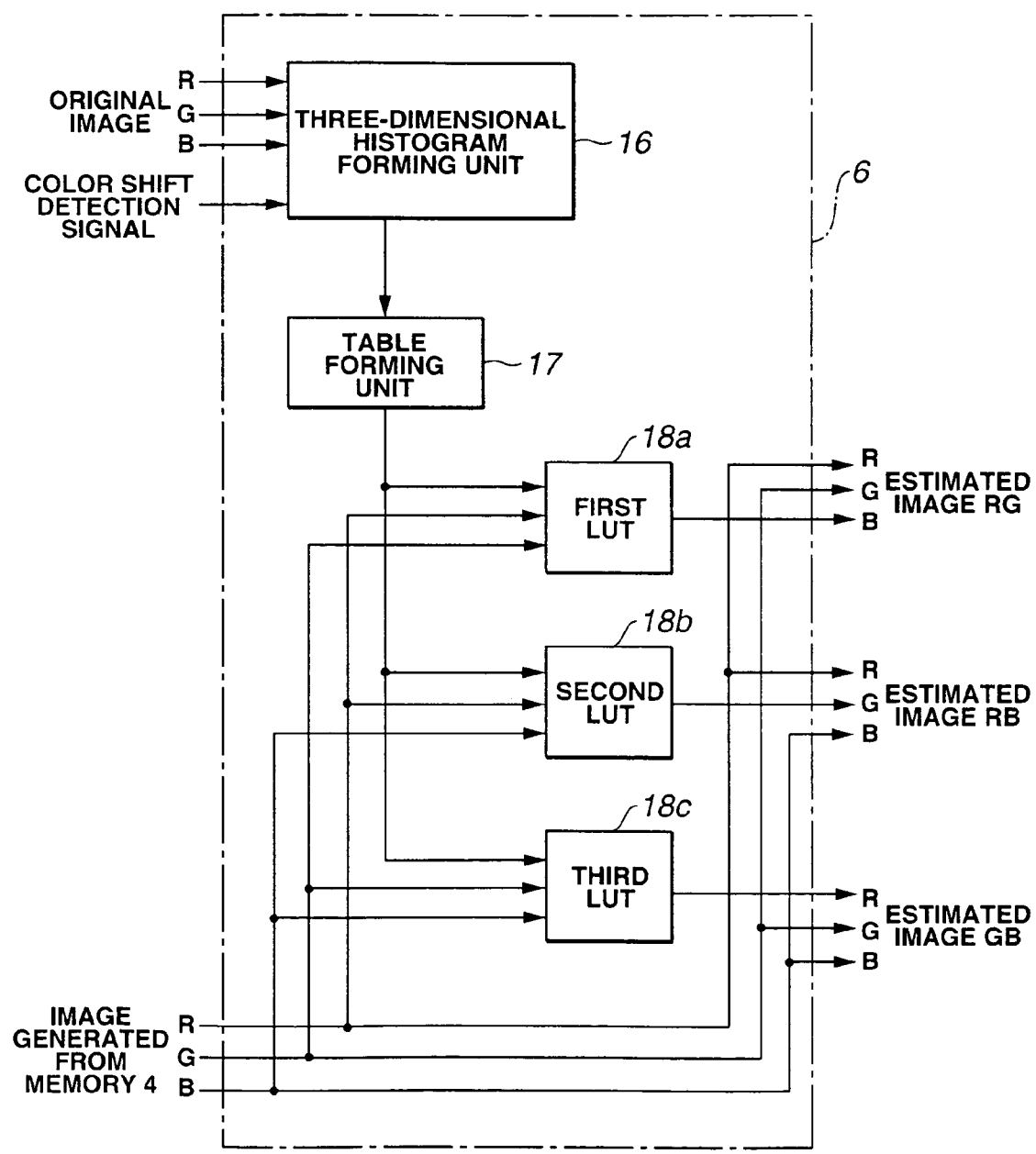

Referring to FIG. 4, the image data estimating unit 6 comprises: a histogram forming unit 16 for forming a three-dimensional histogram from the input RGB image data and the color shift detection signal output from the color shift area detecting unit 3; a table forming unit 17 for writing estimated color data to first to third LUTs 18a to 18c with reference to the three-dimensional histogram formed by the histogram forming unit 16; and the first to third LUTs 18a to 18c for generating estimated color data on the basis of the image data delayed by one field, the image data being generated from the memory 4.

Figure 5:
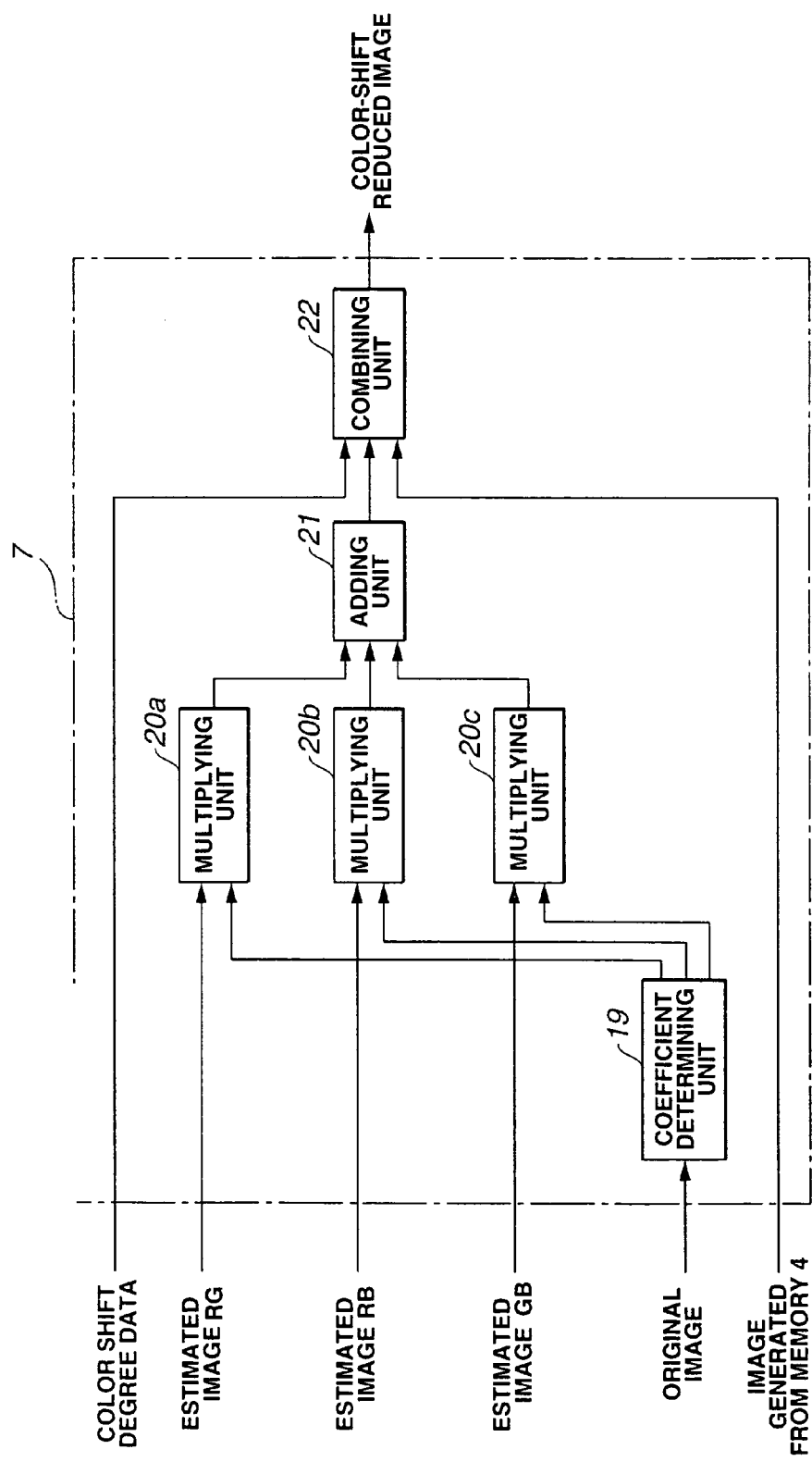

Referring to FIG. 5, the color shift reducing unit 7 comprises: a coefficient determining unit 19 for determining the combination ratio of three estimated image data on the basis of the input image data; multiplying units 20a to 20c each of which multiplies the corresponding estimated image data by a coefficient output from the coefficient determining unit 19; an adding unit 21 for adding data generated from the multiplying units 20a to 20c; and a combining unit 22 for combining correction image data output from the adding unit 21 and the image data output from the memory 4 on the basis of the color shift degree data generated from the color shift degree calculating unit 5 to form a color shift reduced image.

The operation of the color shift reducing apparatus constructed as mentioned above will now be described. First, the operation of the color shift area detecting unit 3 will be described.

Figure 6:
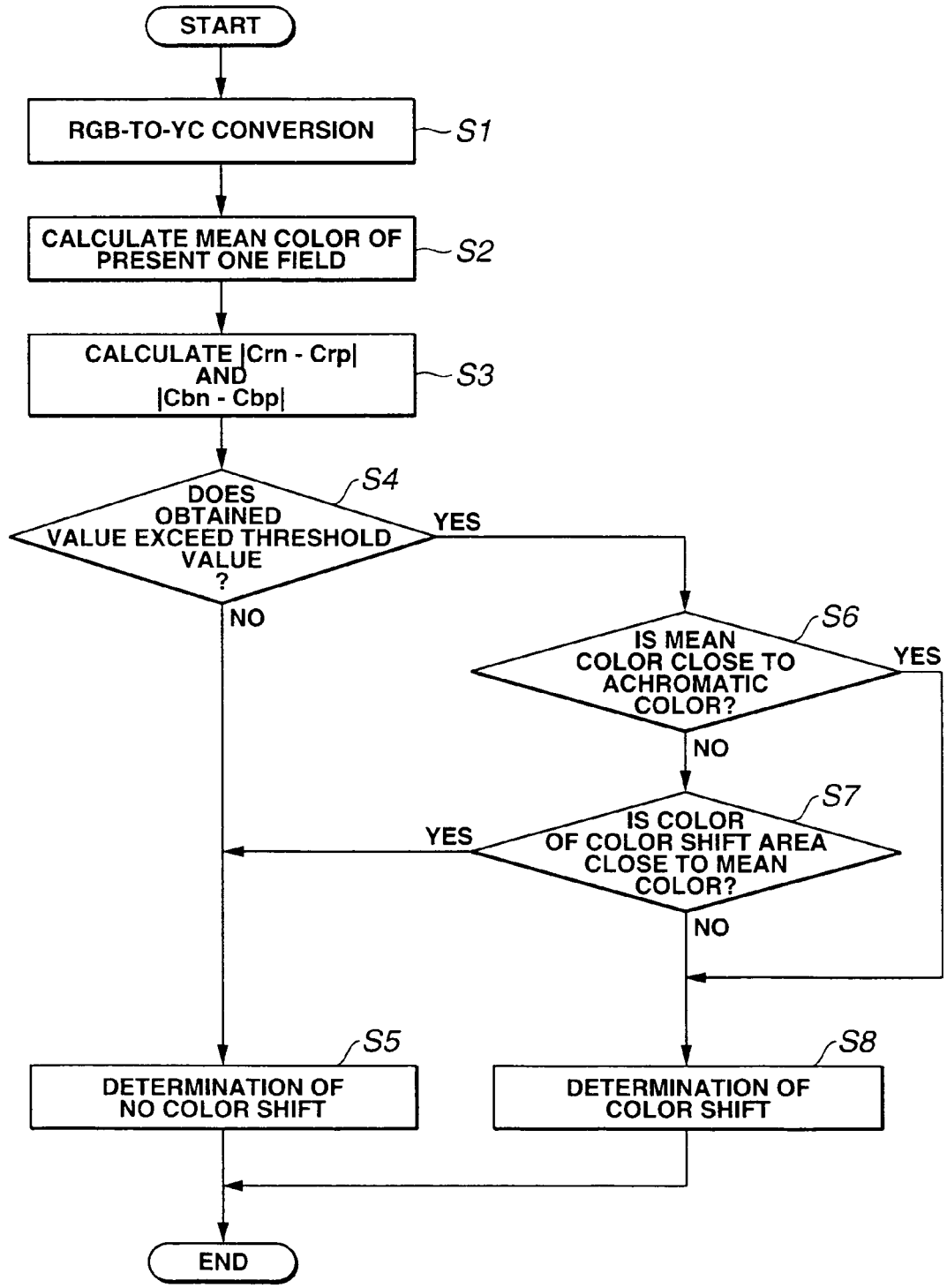

Referring to FIG. 6, in step S1, input image data and image data delayed by four fields through the memory 2 are supplied to the RGB-YC matrix circuit 8, thus calculating the color signals Cr and Cb using the following expressions (1) and (2).

$$Cr=(0.701 \times R - 0.587 \times G - 0.114 \times B)/1.402 \qquad (1)$$

$$Cb=(-0.299 \times R - 0.587 \times G + 0.886 \times B)/1.772 \qquad (2)$$

In step S2, the mean color detecting circuit 10 calculates a mean color of the present one field.

In step S3, the difference detecting circuit 9 calculates |Crn−Crp| and |Cbn−Cbp| from color signals Crn and Cbn of the input image data and color signals Crp and Cbp of the image data delayed through the memory 2, the respective color signals being obtained by the RGB-YC matrix circuit 8. In step S4, whether each difference therebetween exceeds a predetermined threshold value is determined. If both the differences therebetween exceed the threshold value, a determination signal is set to '1'. If both the differences therebetween do not exceed the threshold value, the determination signal is set to '0'. The determination signal is then supplied to the color shift determining circuit 11 (the polarity of the determination signal can be inverted). If the determination signal indicates '0', in step S5, the color shift determining circuit 11 determines that there is no color shift and terminates such a process.

If the determination signal indicates '1', in step S6, the color shift determining circuit 11 determines whether the mean color is close to an achromatic color. The reason is as follows: In a case where an image is close to a monochrome image, if a color produced by color shift is close to the mean color (achromatic color in this case), the produced color may stand out. Therefore, when the mean value is close to the achromatic color (in other words, the present image is close to a monochrome image), in the next step S7, the color shift determining circuit 11 does not determine whether the produced color is close to the means color. In step S8, the color shift determining circuit 11 determines that the image has color shift and then terminates the process.

When the mean color is not close to the achromatic color, in step S7, the color shift determining circuit 11 determines whether the color of an area, which is currently being subjected to the color shift detecting process, is close to the mean color of one field. In other words, when the color of the area currently subjected to the color shift detecting process is close to the mean color of the field, the color shift determining circuit 11 determines that the area does not include color shift on the basis of the results obtained by the difference detecting circuit 9 and the mean color detecting circuit 10. The process proceeds to step S5. It is determined that the image has no color shift. Thus, the process is terminated. When the color of the area currently subjected to the color shift detecting process is not close to the mean color, the color shift determining circuit 11 determines that the area has color shift. The process proceeds to step S8. It is determined that the area has color shift. The process is terminated. The determination result is generated as a color shift detection signal.

For example, determination can also be made: A CrCb color plane is divided into 16×16 areas. When a color, which is currently being subjected to the color shift detecting process, corresponds to 3×3 areas including and surrounding an area to which the mean color corresponds, it is determined that these areas do not include color shift.

Color shift areas detected using only the difference detecting circuit 9 include inconspicuous color shift. Areas which do not need correction are also corrected. On the other hand, the use of the mean color of one field calculated through the mean color detecting circuit 10 realizes effective detection of only visible color shift in the present image.

The above-mentioned process can generate a color shift detection signal obtained by accurately determining a color shift area.

The operation of the image data estimating unit 6 will now be described.

The input image data is supplied to the histogram forming unit 16, together with the color shift detection signal serving as a signal obtained by determining through the color shift area detecting unit 3 whether an area has color shift or does not include color shift. The histogram forming unit 16 forms a three-dimensional histogram in the RGB color space on the basis of image data corresponding to the area determined that there is no color shift (steps S11 to S14 in FIG. 8).

Figure 7:
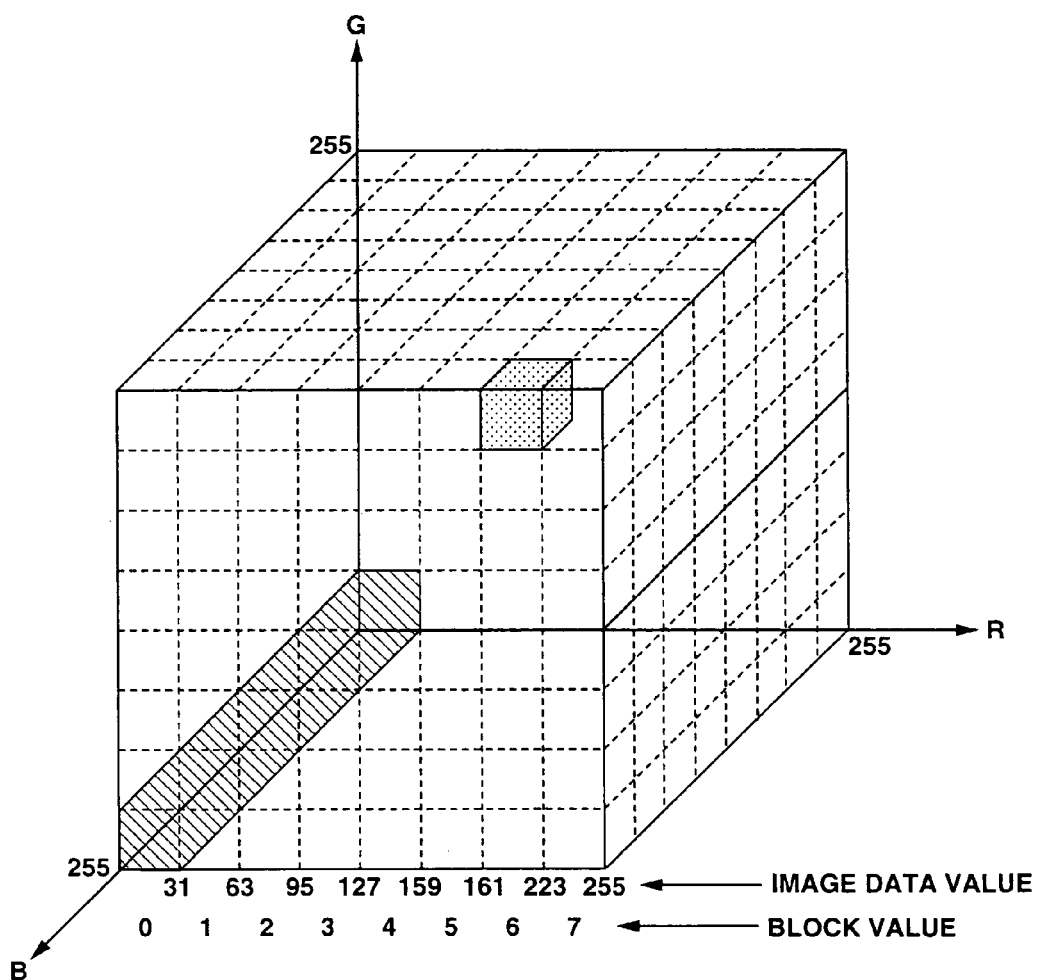

According to the present embodiment, it is assumed that the input image data comprises eight bits. Therefore, each pixel value of the input image data corresponds to any of 256×256×256 points in the RGB color space. The RGB color space is divided into 8×8×8 blocks. Incrementing a counter of each block corresponding to image data having no color shift forms a three-dimensional histogram of one field. FIG. 7 shows the RGB color space divided into 8×8×8 blocks.

According to the present embodiment, the RGB color space is divided into 8×8×8 areas. The RGB color space can also be divided into another division number such as 16×16×16 or 32×32×32.

For instance, it is assumed that image data of (R, G, B)=(200, 230, 230) is input and a pixel corresponding to the image data is determined as an area with no color shift. Higher-order three bits of the input image data are referred to. The image data corresponds to a block of (R, G, B)=(6, 7, 7). A counter value of this block is incremented. The operation is repetitively performed the number of pixels of one field, thus forming a three-dimensional histogram which is used as a material to determine which block has many pixels with no color shift.

The table forming unit 17 forms table data to be written to the first to third LUTs 18a to 18c from the formed three-dimensional histogram of one field.

Figure 9:
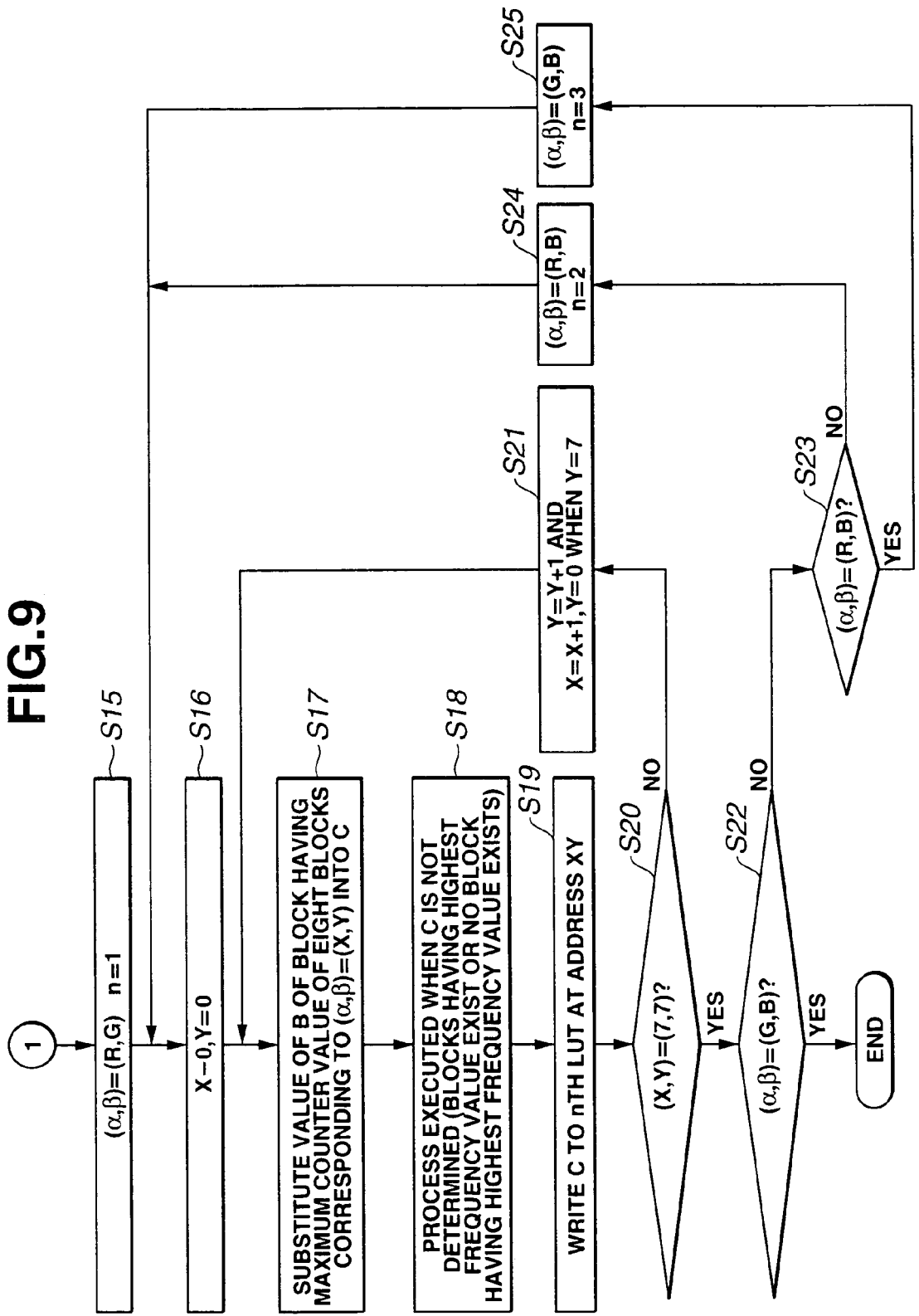

Referring to steps S15 to S22 of FIG. 9, when forming the three-dimensional histogram of one field is completed, the table forming unit 17 refers to respective counter values of a group of blocks (hatched portion in FIG. 7) corresponding to (R, G)=(0, 0), namely, eight blocks corresponding to (R, G, B)=(0, 0, 0) to (0, 0, 7). The table forming unit 17 determines a value (any of 0 to 7) of B of the block having the highest frequency value (the number of pixels with no color shift is the most) as an estimate of B of the group of blocks corresponding to (R, G)=(0, 0), namely, as estimated color data of B of each pixel corresponding to each block in which both R and G indicate 0. Then, the table forming unit 17 writes the estimated color data to the first LUT 18a at an address "000000". The similar operation is sequentially repeated 64 times to process blocks from the group of blocks corresponding to (R, G)=(0, 0) to a group of blocks corresponding to (R, G)=(7, 7), thus determining estimated color data to be written to the first LUT 18a at addresses "000000" to "111111" and writing the data at the respective addresses.

In the determination of the highest frequency value, when all of the count values of eight blocks denote zero (the blocks are a group of blocks having no areas with no color shift in input original image data), estimated color data is determined as a predetermined fixed value (zero or a representative value that is often found in endoscopic images). If there are a plurality of blocks having the highest frequency value, an intermediate value of the blocks (for example, when blocks corresponding to 0 and 7 have the highest frequency value, the intermediate value indicates 2 or 3) or a value of a block that is close to the block having the second highest frequency value is determined as estimated color data.

Similarly, in steps S23 and 24 and steps S15 to S21 of FIG. 9, the above-mentioned operation is repetitively performed to groups of blocks of (R, B)=(0, 0) to (7, 7) to determine estimated color data to be written to the second LUT 18b at addresses "000000" to "111111" and write the data at the addresses. In steps S23 and S25 and steps S15 to S21 of FIG. 9, the above-mentioned operation is repetitively performed to groups of blocks of (G, B)=(0, 0) to (7, 7), thus determining estimated color data to be written to the third LUT 18c at addresses "000000" to "111111" of the third LUT 18c and writing the data at the addresses.

The memory 4 delays input image data until writing the estimated color data formed through the table forming unit 17 on the basis of the image data of one field in the first to third LUTs 18a to 18c is finished (by about one field). The image data delayed by one field through the memory 4 is input to the first to third LUTs 18a to 18c.

The first LUT 18a uses high-order three bits of each of R and G image data values of the image data supplied from the memory 4, assigns the high-order three bits of R to high-order three bits of an address in the first LUT 18a, assigns the high-order three bits of G to low-order three bits of the address in the first LUT 18a to read estimated color data of B from table data written in the first LUT 18a on the basis of the formed address. The read estimated color data of B is combined with data indicating the high-order three bits of R and data indicating the high-order three bits of G, which are used in forming the foregoing address in the first LUT 18a, of the image data supplied from the memory 4. The combined data is output as an estimated image RG.

Similarly, G estimated color data is read out from the second LUT 18b on the basis of R and B image data value in the image data supplied from the memory 4 and combined data is output as an estimated image RB. R estimated color data is read out from the third LUT 18c on the basis of G and B image data values and combined data is output as an estimated image GB.

The estimated images obtained in the above arrangement have accuracy higher than that obtained by estimating methods of conventional color shift reducing apparatuses.

It is assumed that a color of a bleeding portion of (R, G, B)=(200, 20, 10) and a color of a stain such as methylene blue of (R, G, B)=(30, 20, 150) exist in the same field. This case will now be described (to simplify the description, it is assumed that other colors do not exist in this field).

Pixels corresponding to the color of (R, G, B)=(200, 20, 10) are estimated. If the color is estimated using R and B image data values, the color of (R, G, B)=(200, 20, 10) can be estimated. Conventionally, when the color is estimated using only G image data value, which of the color of the bleeding portion and that of the stain is estimated is determined depending on the difference between the number of pixels of an area corresponding to the bleeding portion in the field and the number of pixels of a stained area. Accordingly, the bleeding portion may be estimated using the color of the stain. On the other hand, the stained portion may be estimated using the color of the bleeding portion. When it is assumed that the number of pixels of the stained area is larger than that of the area corresponding to the bleeding portion, the color of (R, G, B)=(30, 20, 150) is estimated.

Therefore, an estimated image, obtained by combining data estimated from three color components, is influenced by estimated color data based on G image data. Unfortunately, the color of the area corresponding to the bleeding portion may be a low-saturation color (achromatic color).

However, according to the estimating method of the color shift reducing apparatus according to the present invention, a color is estimated using two color components of R and G, R and B, or G and B. Accordingly, the color of the area corresponding to the bleeding portion of (R, G, B)=(200, 20, 10) can be estimated. Thus, an estimated image obtained by combining data estimated from three color components can also be estimated with high accuracy.

The operation of the color shift degree calculating unit 5 will now be described.

The histogram forming unit 12 of the color shift degree calculating unit 5 operates similar to the histogram forming unit 16 of the image data estimating unit 6. Therefore, the description of the operation of the unit 12 is omitted.

When the formation of a three-dimensional histogram of one field is completed, the table forming unit 13 writes the three-dimensional histogram, formed through the histogram forming unit 12, as table data for calculation of the degree of color shift to the LUT 14. First, a counter value of a block corresponding to (R, G, B)=(0, 0, 0) is read out, the degree of color shift is determined in accordance with the image size (the number of pixels of one field) of image data, and the determined degree is written as table data for calculation of the degree of color shift to the LUT 14 at an address "000000000".

According to the present embodiment, the degree of color shift is expressed using 8-bit data indicating a value in a range of 0 to 255. As a counter value is larger, the degree of color shift is closer to zero. In other words, it is determined that the corresponding color is not shifted. On the other hand, as a counter value, is smaller, the degree of color shift is closer to 255, in other words, it is determined that the corresponding color is shifted. When it is determined that a color is not shifted, the corresponding counter value indicates zero. When it is determined that a color is completely shifted, the corresponding counter value indicates 255. According to the present embodiment, the degree of color shift is expressed using 8-bit data. The number of bits of data is not limited to eight bits. Another number of bits such as 16 bits or four bits can also be used.

Figure 10:
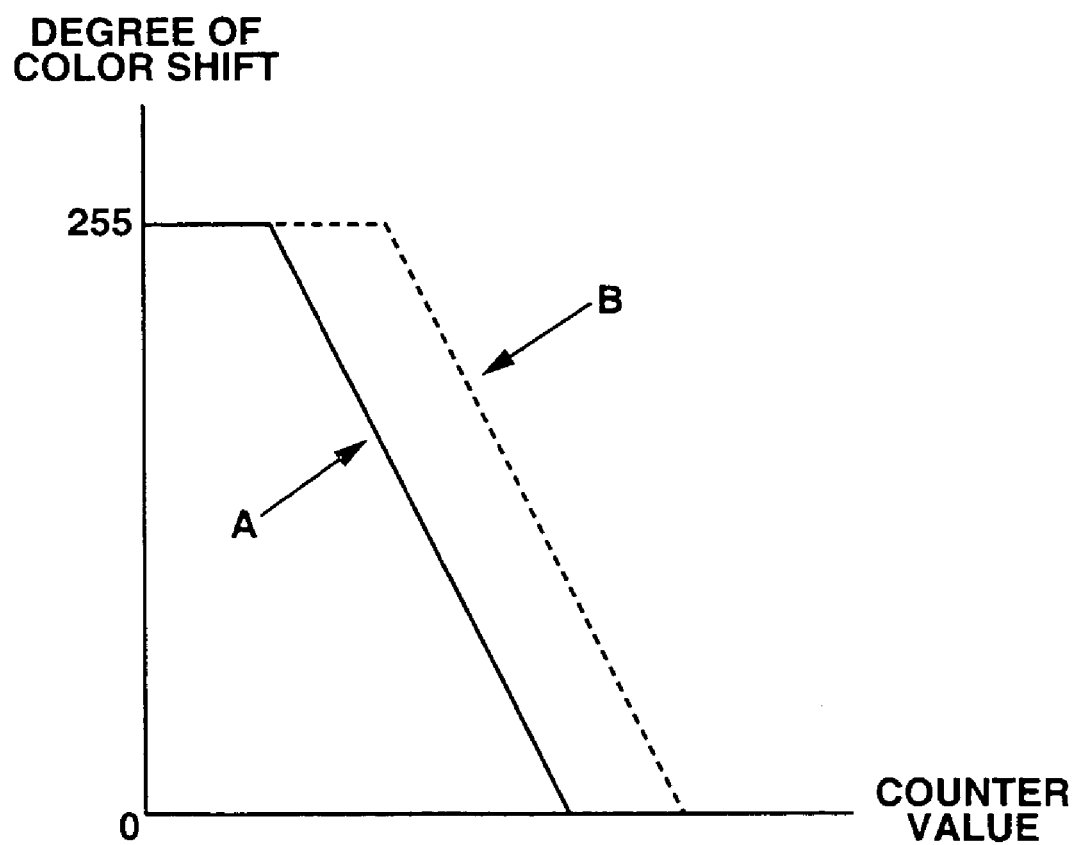

FIG. 10 shows an example of a graph used in converting a counter value into the degree of color shift. Which value of 0 to 255 is applied is changed depending on the image size of image data. For example, referring to FIG. 10, it is assumed that a counter value of image data having an image size X is converted into the degree of color shift on the basis of a conversion graph A. When image data has an image size Y that is smaller than the image size X, the total number of pixels is smaller than that of the image size X. Therefore, when a counter value of the image size Y is the same as that of the image size X, the possibility of color shift is increased. Preferably, the degree of color shift indicates a value that is higher than that of the image size X. Therefore, in this case, a counter value is converted into the degree of color shift on the basis of a conversion graph B.

Similar to the case of (R, G, B)=(0, 0, 0), counter values of 512 blocks corresponding to (R, G, B)=(0, 0, 1) to (7, 7, 7) are read out in total. The degrees of color shift are written to the LUT 14 at addresses "000000000" to "111111111" in each of which a value indicating R is assigned to the most significant bit, a value indicating G is assigned to the next high-order bit, and a value indicating B is assigned to the least significant bit, thus completely forming a table for calculation of the degree of color shift in the LUT 14.

Image data delayed through the memory 4 is supplied to the LUT 14 completed as the table for calculation of the degree of color shift. The degree of color shift of the corresponding block is read from the RGB color space every pixel. The degree of color shift is output to the LPF 15, thus smoothing the degree of color shift in accordance with the degrees of color shift of surrounding pixels.

The LPF 15 comprises a 3×3 smoothing filter. In forming a color shift reduced image, the LPF 15 suppresses a variation or a steep change in degrees of color shift between adjacent pixels so that an unnatural image is not produced. According to the present embodiment, the size of 3×3 is used. The other size such as 5×5 can also be used. The size can be changed in accordance with conditions of an image.

The operation of the color shift reducing unit 7 will now be described.

In endoscopic images, a change in color is dominated by blood or a stain (such as methylene blue). In the images, in many cases, the brightness distribution of only one color component of R, G, and B color components is wide (for 8-bit data, brightness values are distributed in a wide range of 0 to 255) and brightness values of the other color components are concentrated to low values (for example, when a change in color is dominated by blood, the only one color component is R, or when a change in color is dominated by the stain, the only color component is B).

In the estimation of data indicating the other color components on the basis of color component data of the above image using the method according to the present embodiment, color component data having narrow brightness distribution is concentrated to limited blocks in the RGB color space of FIG. 7. Accordingly, estimated colors are restricted to some colors.

Therefore, the following tendency is shown: An estimated image derived from color component data with wide brightness distribution has higher accuracy than an estimated image derived from color component data with narrow brightness distribution.

In endoscopic images, the respective mean values of the R, G, and B color components of the images are calculated. The mean value of a color with wide brightness distribution tends to be high and that of a color with narrow brightness distribution tends to be low. When both of blood and a stain (methylene blue) govern a change in color in substantially the same proportion, both of R and B color components have wide brightness distribution. The mean value of each color component tends to be intermediate (about 128 in the case of 8-bit data). The G color component has narrow brightness distribution and the mean value thereof tends to be low. In this case as well, when brightness distribution of a color component is wide, the mean value thereof tends to be high. The present embodiment uses the above-mentioned properties. Advantageously, the scale of a circuit can be reduced as much as possible. Accordingly, the combination ratio simply reflecting the above tendency of distribution of color components is calculated using the mean values.

The coefficient determining unit 19 calculates the combination ratio of the estimated image RG from R and G data, that of the estimated image RB from R and B data, and that of the estimated image GB from G and B image data on the basis of the mean values of the R, G, and B color components of the input image data.

First, mean values $\overline{R_{AVG}}$, $\overline{G_{AVG}}$, and $\overline{B_{AVG}}$ of one field of R, G, and B of the input image data are calculated. A mean value of $\overline{R_{AVG}}$ and $\overline{G_{AVG}}$, that of $\overline{R_{AVG}}$ and $\overline{B_{AVG}}$, and that of $\overline{G_{AVG}}$ and $\overline{B_{AVG}}$ are calculated from the obtained mean values $\overline{R_{AVG}}$, $\overline{G_{AVG}}$, and $\overline{B_{AVG}}$. Let $\overline{RG_{AVG}}$, $\overline{RB_{AVG}}$, and $\overline{GB_{AVG}}$ be the obtained mean values, respectively.

Let Crg, Crb, and Cgb denote the combination ratio of the estimated image RG, that of the estimated image RB, and that of the estimated image GB, respectively. The combination ratios of the respective estimated images are calculated using the following expressions (3) to (5). The ratios Crg, Crb, and Cgb are output to the multiplying units 20a, 20b, and 20c, respectively.

$$Crg = \overline{RG_{AVG}} / (\overline{RG_{AVG}} + \overline{RB_{AVG}} + \overline{GB_{AVG}}) \quad (3)$$

$$Crb = \overline{RB_{AVG}} / (\overline{RG_{AVG}} + \overline{RB_{AVG}} + \overline{GB_{AVG}}) \quad (4)$$

$$Cgb = \overline{GB_{AVG}} / (\overline{RG_{AVG}} + \overline{RB_{AVG}} + \overline{GB_{AVG}}) \quad (5)$$

The multiplying unit 20a multiplies the estimated image data RG output from the first LUT 18a by a coefficient Crg generated from the coefficient determining unit 19 and then generates obtained data to the adding unit 21.

Similarly, the multiplying unit 20b multiplies the estimated image data RB by a coefficient Crb and the multiplying unit 20c multiplies the estimated image data GB by a coefficient Cgb. Each obtained data is supplied to the adding unit 21.

The adding unit 21 adds the data supplied from the multiplying units 20a to 20c to form correction image data.

The correction image data formed as mentioned above is calculated every field at the optimum combination ratio based on the tone of the whole frame. The correction image data is formed with higher accuracy than that of the conventional color shift reducing apparatus.

The combining unit 22 combines the correction image data output from the adding unit 21 and the image data supplied from the memory 4 on the basis of the color shift degree data generated from the color shift degree calculating unit 5. As the possibility of color shift is higher, the color shift degree data is closer to 255. Accordingly, when the color shift degree data indicates 255, 100% of the correction image data is used in combination. On the other hand, when the color shift degree data indicates zero, 100% of the image data supplied from the memory 4 is used in the combination. When the color shift degree data indicates 128, the correction image data is combined with the image data supplied from the memory 4 in the ratio of 5:5.

As mentioned above, according to the color shift reducing apparatus according to the present embodiment, the accuracy of an estimated image to be applied to a color shift area is higher than that of the conventional color shift reducing apparatus. Consequently, a color shift reduced image to be applied to an image in which both blood and a stain exist in the same field is obtained as a natural image. Thus, a natural color shift reduced image can be formed.

Second Embodiment

Figure 11:
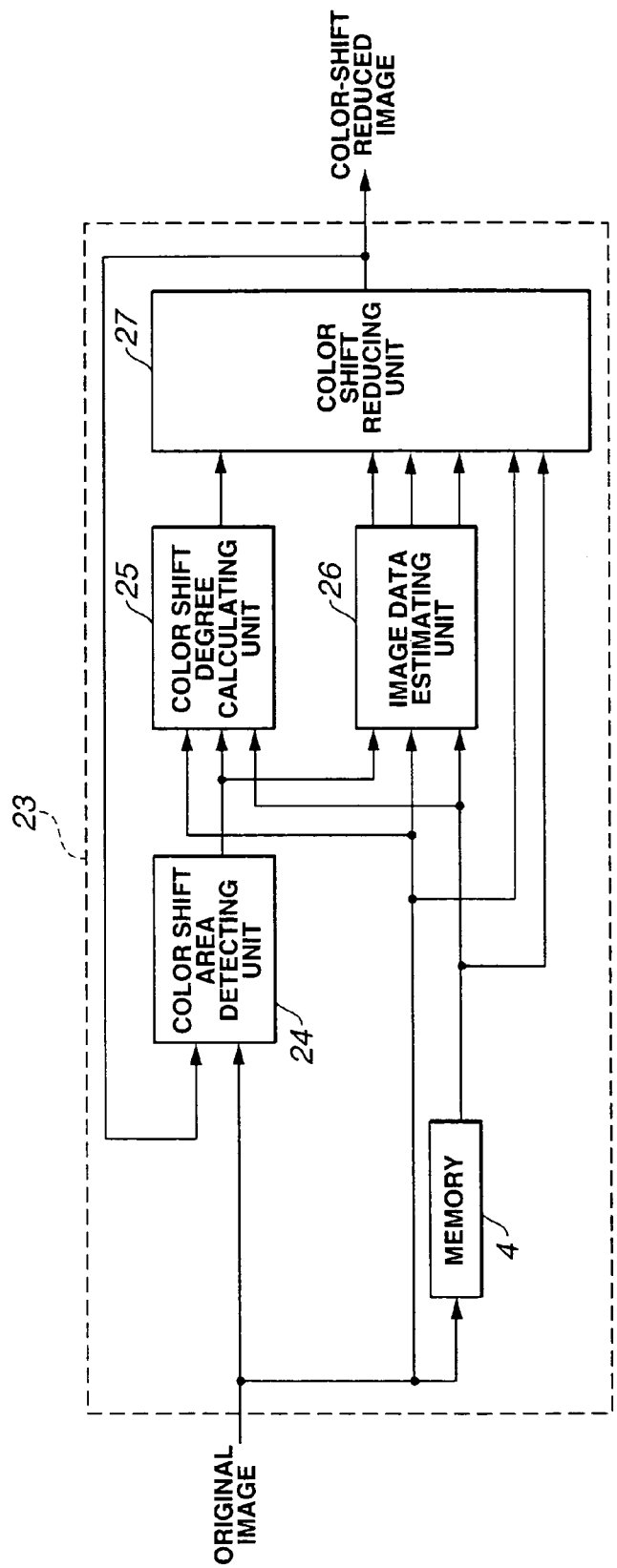
FIGS. 11 to 19 relate to a second embodiment of the present invention, FIG. 11 being a block diagram of the structure of a color shift reducing apparatus, FIG. 12 being a block diagram of the structure of a color shift area detecting unit in FIG. 11, FIG. 13 being a block diagram of the structure of a color shift degree calculating unit in FIG. 11, FIG. 14 being a block diagram of the structure of an image data estimating unit in FIG. 11, FIG. 15 being a block diagram of the structure of a color shift reducing unit in FIG. 11, FIG. 16 being a flowchart of the color shift detecting operation performed through the color shift area detecting unit in FIG. 11, FIG. 17 showing a CrCb color space divided into 8×8 areas, the space being used in the operation of FIG. 16, FIG. 18 showing a CrCb color space obtained by a dividing method different from that in FIG. 17, FIG. 19 being a flowchart of the operation for writing estimated color data to LUTs, the operation being performed by the image data estimating unit in FIG. 11.

Referring to FIG. 11, the structure of a color shift reducing apparatus 23 according to the present embodiment is substantially the same as that of the color shift reducing apparatus according to the first embodiment excluding the supply of a color shift reduced image to a color shift area detecting unit 24, the internal structure of a color shift degree calculating unit 25, the internal structure of an image data estimating unit 26, and the internal structure of a color shift reducing unit 27. Accordingly, the difference therebetween will now be described. The same components are designated by the same reference numerals to omit the description of the same components.

Figure 12:
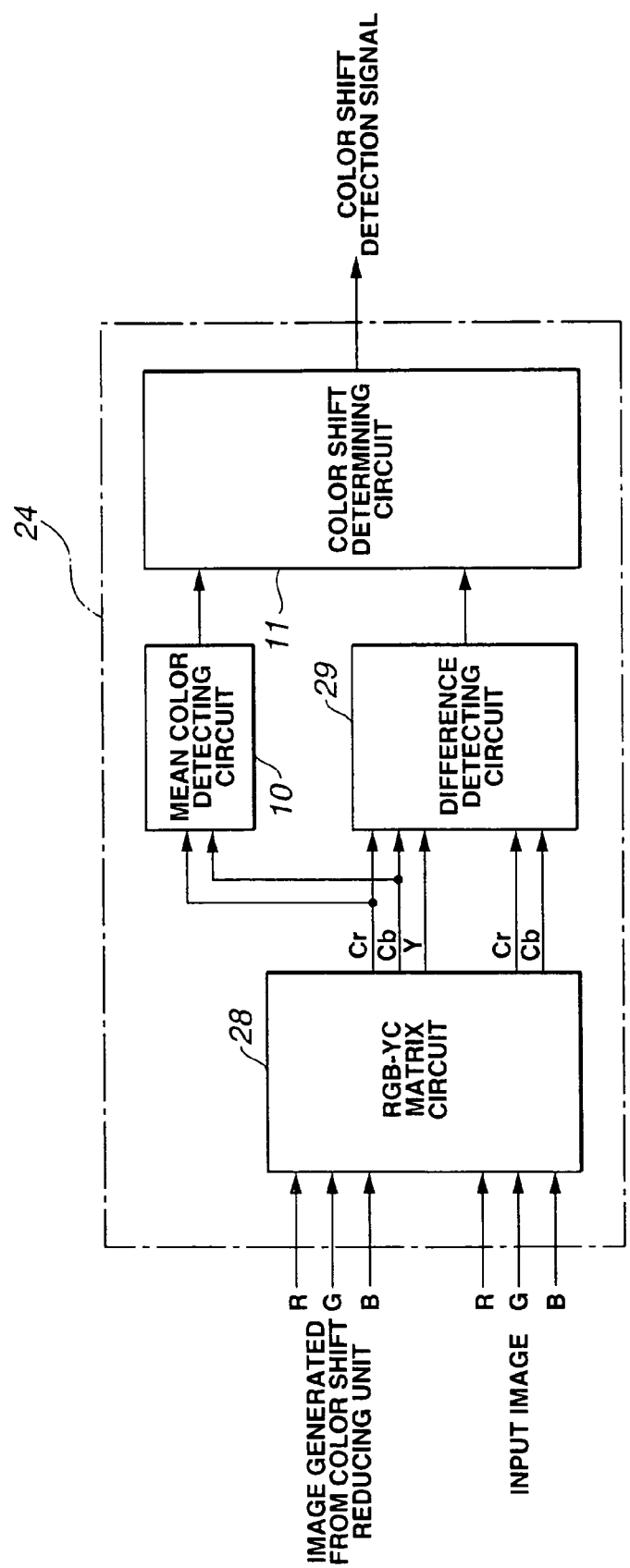

Referring to FIG. 12, the color shift area detecting unit 24 comprises: an RGB-YC matrix circuit 28 for calculating color signals Cr and Cb and a brightness signal Y from input image data of RGB and a color shift reduced image processed through the color shift reducing unit 27 and then outputting the calculated signals; and a difference detecting circuit 29 for calculating a difference between the signal Cr of the input image data and that of the color shift reduced image processed through the color shift reducing unit 27 and a difference between the signal Cb of the input image data and that of the color shift reduced image processed through the color shift reducing unit 27 and then determining whether each difference therebetween changes by a predetermined value or more, the predetermined value being based on information of the brightness signal Y of the color shift reduced image. The other components are the same as those according to the first embodiment.

Figure 13:
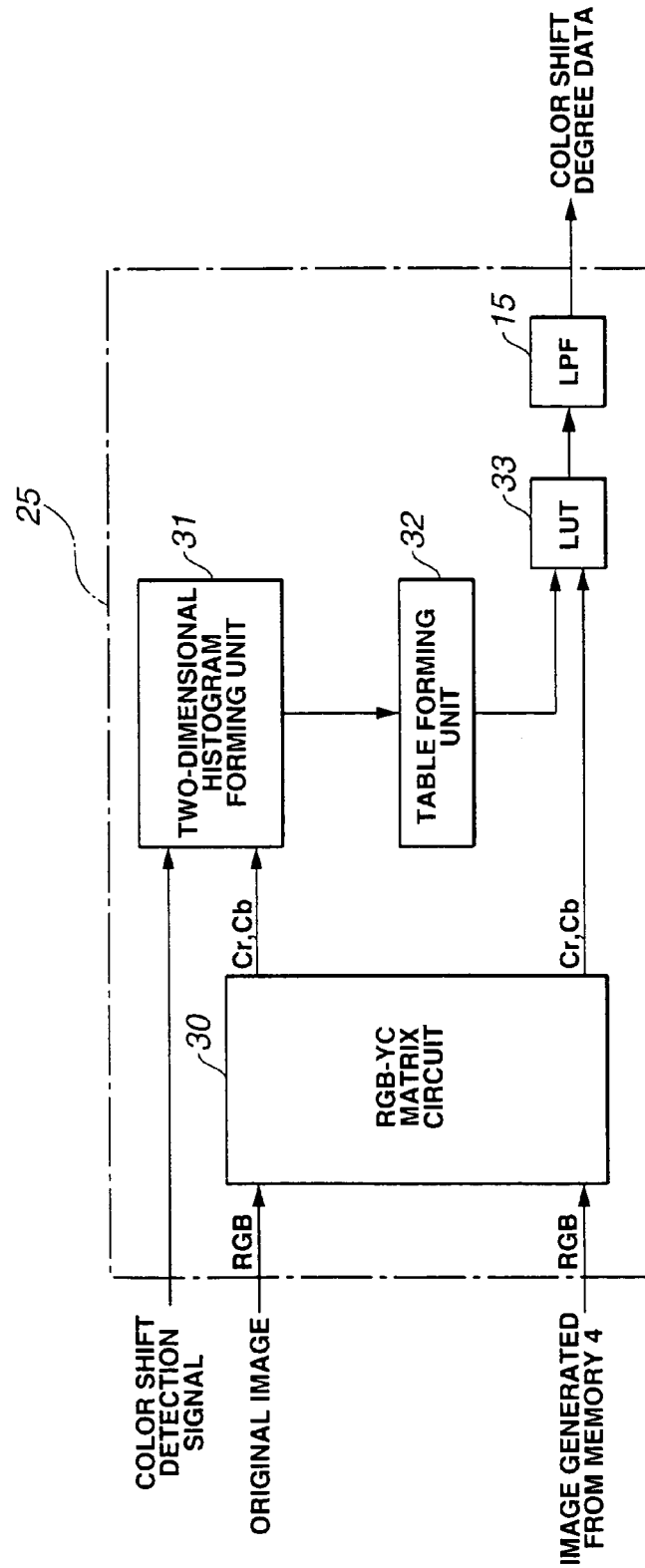

Referring to FIG. 13, the color shift degree calculating unit 25 comprises: an RGB-YC matrix circuit 30 for converting each of input image data of RGB and image data delayed by one field, the image data being supplied from the memory 4, into color signals Cr and Cb; a histogram forming unit 31 for forming a two-dimensional histogram on the basis of the color signals Cr and Cb converted from the input RGB image data and a color shift detection signal output from the color shift area detecting unit 24; a table forming unit 32 for writing table data for calculation of the degree of color shift to an LUT 33 with reference to the two-dimensional histogram formed by the histogram forming unit 31; and the LUT 33 for generating data indicating the degree of color shift on the basis of the color signals Cr and Cb which are output from the RGB-YC matrix circuit 30 and are obtained by converting the RGB image data delayed through the memory 4. The other component is the same as that of the first embodiment.

Figure 14:
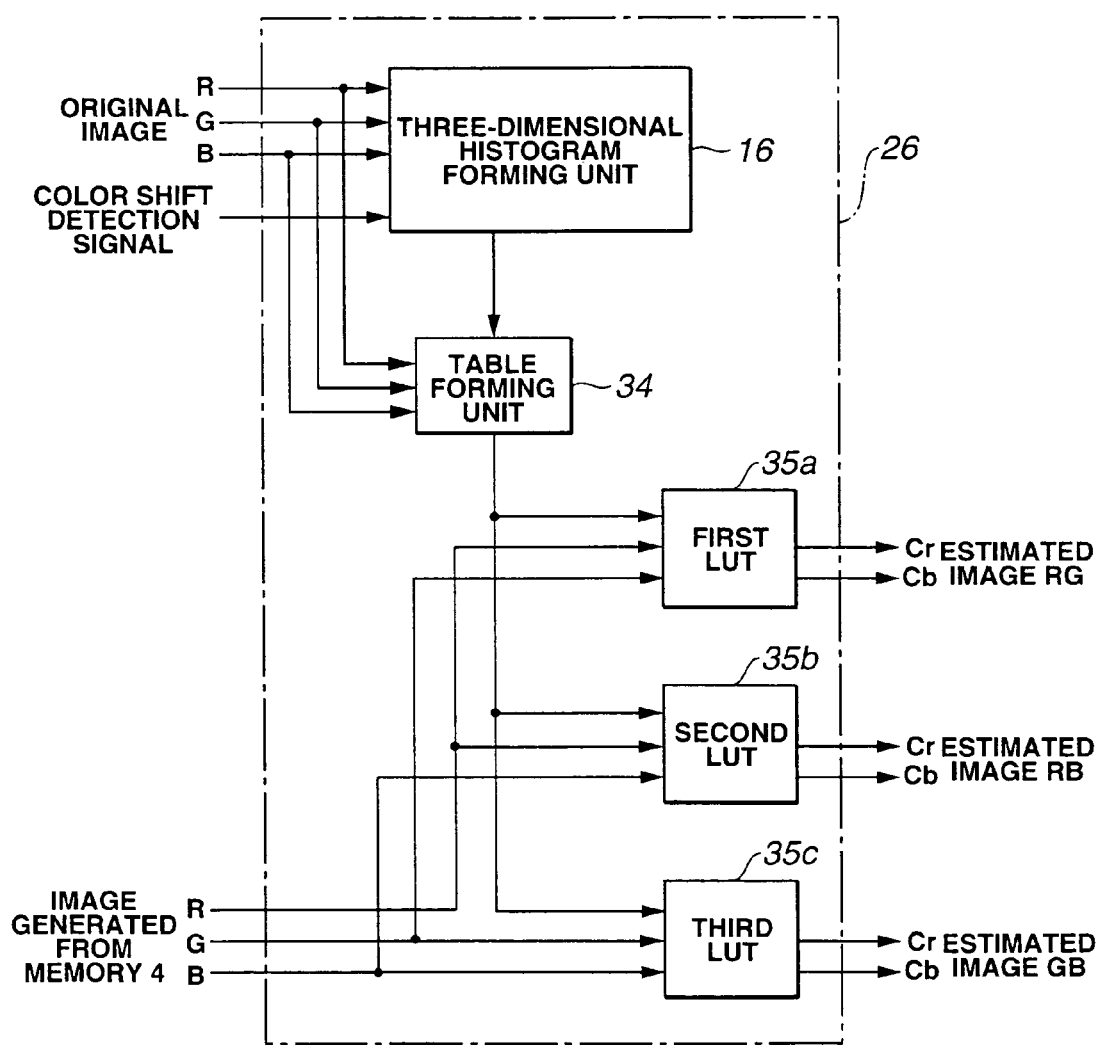

Referring to FIG. 14, the image data estimating unit 26 comprises: a table forming unit 34 for writing estimated color data to LUTs 35a to 35c with reference to the three-dimensional histogram formed through the histogram forming unit 16; and the first to third LUTs 35a to 35c for generating estimated color data on the basis of the image data output from the memory 4, the image data being delayed by one field. The other component is the same as that of the first embodiment.

Figure 15:
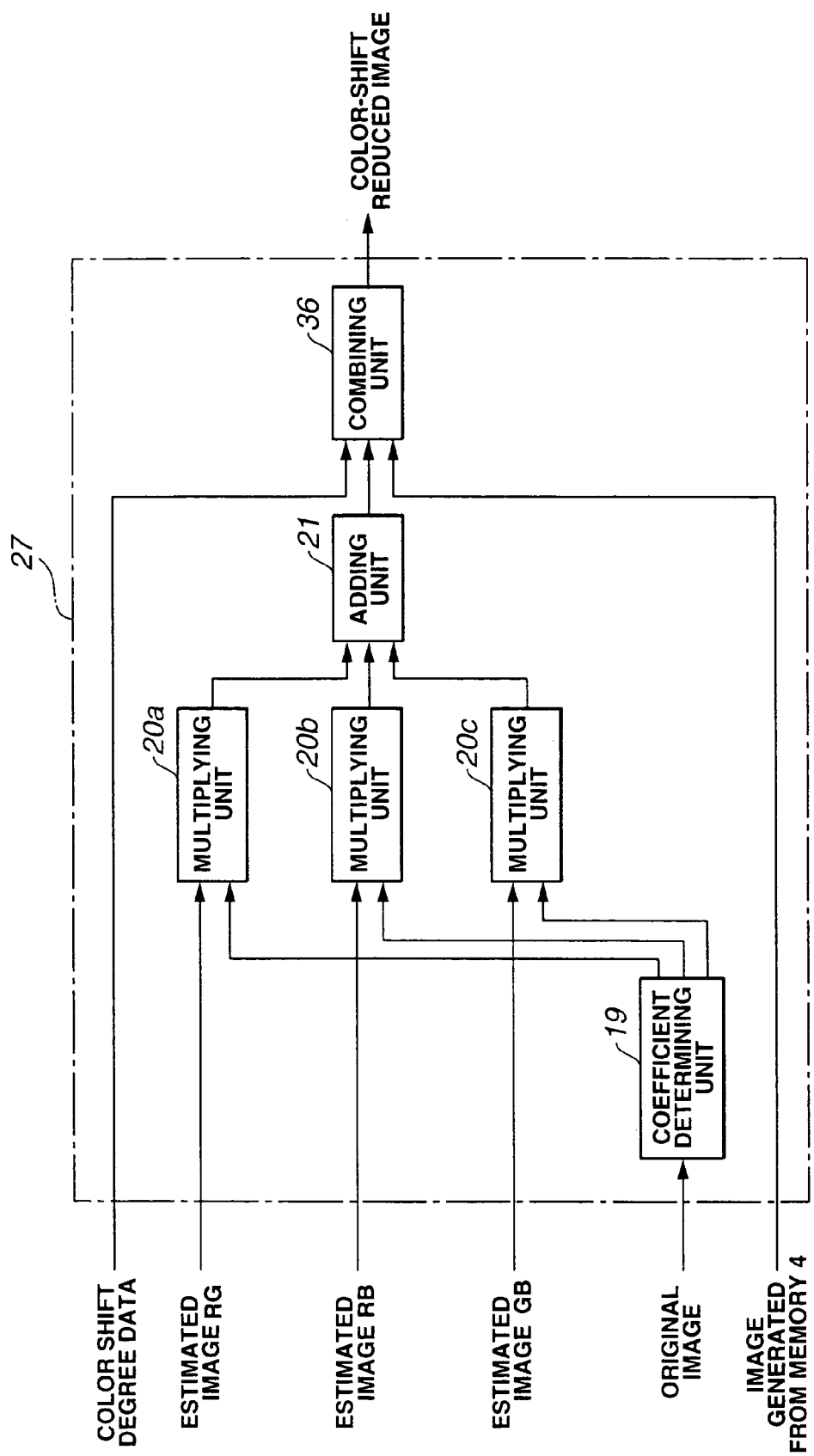

Referring to FIG. 15, the color shift reducing unit 27 comprises a combining unit 36 for combining correction image data output from the adding unit 21 and the image data output from the memory 4 on the basis of the color shift degree data output from the color shift degree calculating unit 25 to form a color shift reduced image. The other components are the same as those of the first embodiment.

The operation of the color shift reducing apparatus constructed as mentioned above will now be described.

The operation of the color shift area detecting unit 24 will now be described with reference to FIG. 16.

Figure 16:
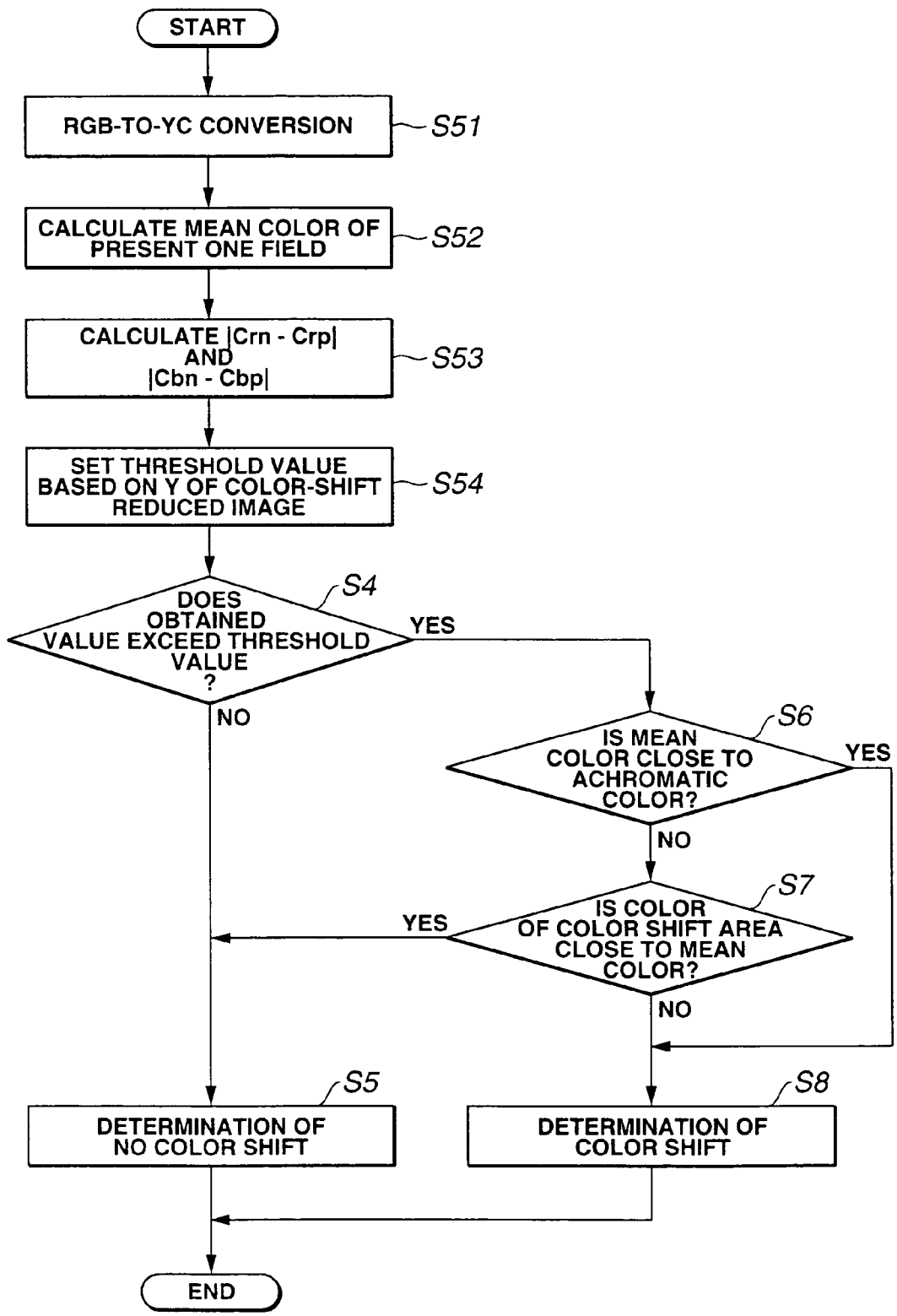

Referring to FIG. 16, the input image data and the color shift reduced image data output from the color shift reducing unit 27 are supplied to the RGB-YC matrix circuit 28. In a manner similar to the first embodiment, the color signals Cr and Cb are calculated in step S51 (refer to the expressions (1) and (2)). In addition, the brightness signal Y is calculated from color shift reduced image data by the following expression (6).

$$Y=0.3 \times R+0.59 \times G+0.11 \times B \quad (6)$$

In step S52, the mean color detecting circuit 10 calculates a mean color of the present one field.

In the same way as the first embodiment, in step S53, the difference detecting circuit 29 calculates |Crn−Crp| and |Cbn−Cbp| on the basis of color signals Crn and Cbn of the input image data and color signals Crp and Cbp of the color shift reduced image data, the color signals being obtained by the RGB-YC matrix circuit 28. Whether each of |Crn−Crp| and |Cbn−Cbp| exceeds a predetermined threshold value is determined. The second embodiment differs from the first embodiment in that the threshold value varies depending on the mean brightness value $\overline{Y_{AVG}}$ of the brightness signal Y of the color shift reduced image data.

A slight change in color, namely, slight color shift may stand up conspicuously in a dark image with low saturation. In this image, color signals Cr and Cb of the whole image tend to be low (achromatic and monochrome image). In color shift determination using a fixed threshold value in the same way as the first embodiment, slight color shift may not be detected. Therefore, when the mean brightness value $\overline{Y_{AVG}}$ of the color shift reduced image data is low, it is necessary to set the threshold value to a low value. In step S54, the threshold value is set on the basis of the mean brightness value $\overline{Y_{AVG}}$ of the color shift reduced image data.

As mentioned above, the threshold value used in color shift detection is varied in accordance with the brightness of the image and a result of the color shift detection is output to the color shift determining circuit 11. The operation and function of the color shift determining circuit 11 are the same as those of the first embodiment. Steps S4 to S8 described in FIG. 6 are executed.

The color shift detection performed in the above structure can improve the detection of color shift in a dark image, the color shift in the dark image being difficult to detect according to the first embodiment.

According to the present embodiment, the mean brightness value of the color shift reduced image data is obtained and used in setting the threshold value. The mean brightness value of input image data can also be obtained and used in setting the threshold value.

The operation of the color shift degree calculating unit 25 will now be described.

The input image data and the image data, supplied from the memory 4 and delayed by one field, are input to the RGB-YC matrix circuit 30 to calculate the color signals Cr and Cb of the respective image data. The color signals of the input image data are output to the histogram forming unit 31. The color signals of the image data supplied from the memory 4 are output to the LUT 33.

The color signals of the input image data are supplied to the histogram forming unit 31, together with a color shift detection signal generated through the color shift area detecting unit 24. The histogram forming unit 31 forms a two-dimensional histogram in a CrCb color space on the basis of image data which is determined as image data with no color shift.

Figure 17:
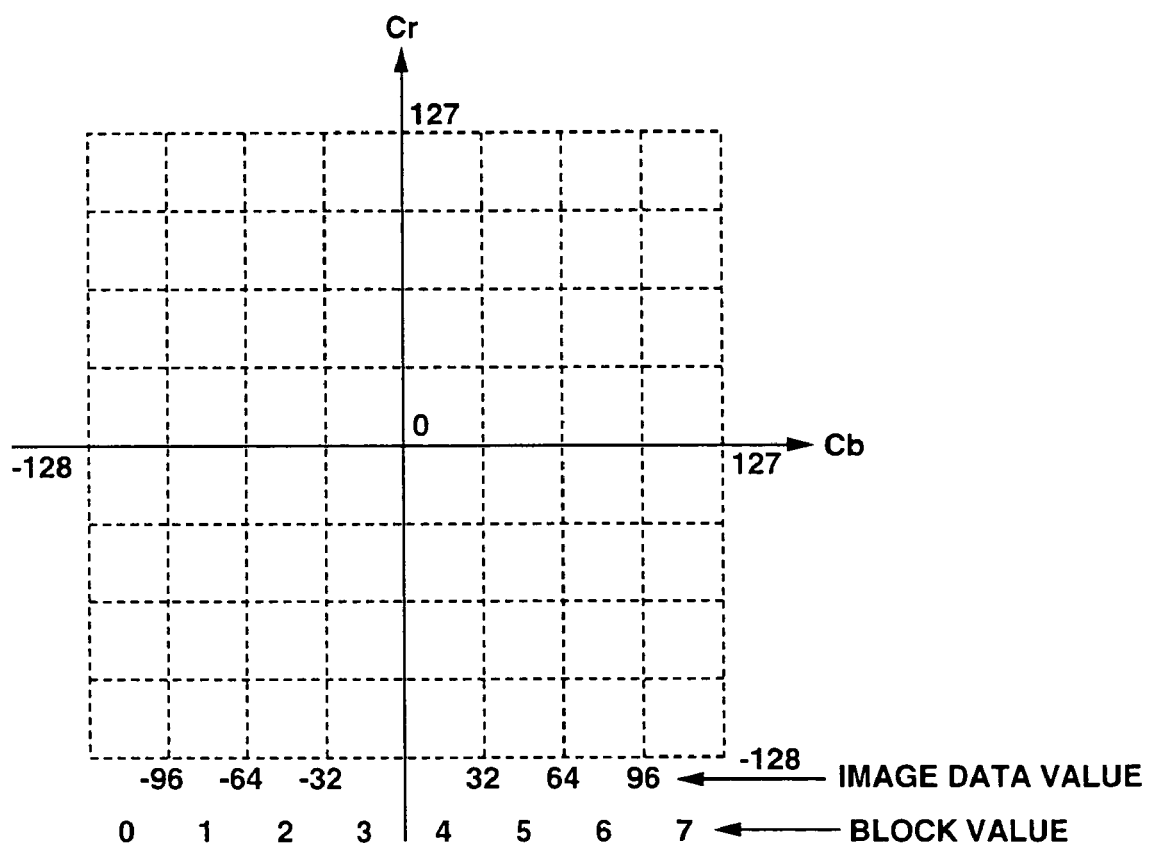

According to the present embodiment, input image data comprises 8 bits in the same way as the first embodiment. Therefore, each pixel value of input image data corresponds to any of 256×256 points in the CrCb color space. The CrCb color space is divided into 8×8 blocks. A counter of each block to which image data with no color shift corresponds is incremented to form a two-dimensional histogram of one field. FIG. 17 shows the CrCb color space divided into 8×8 blocks.

Figure 18:
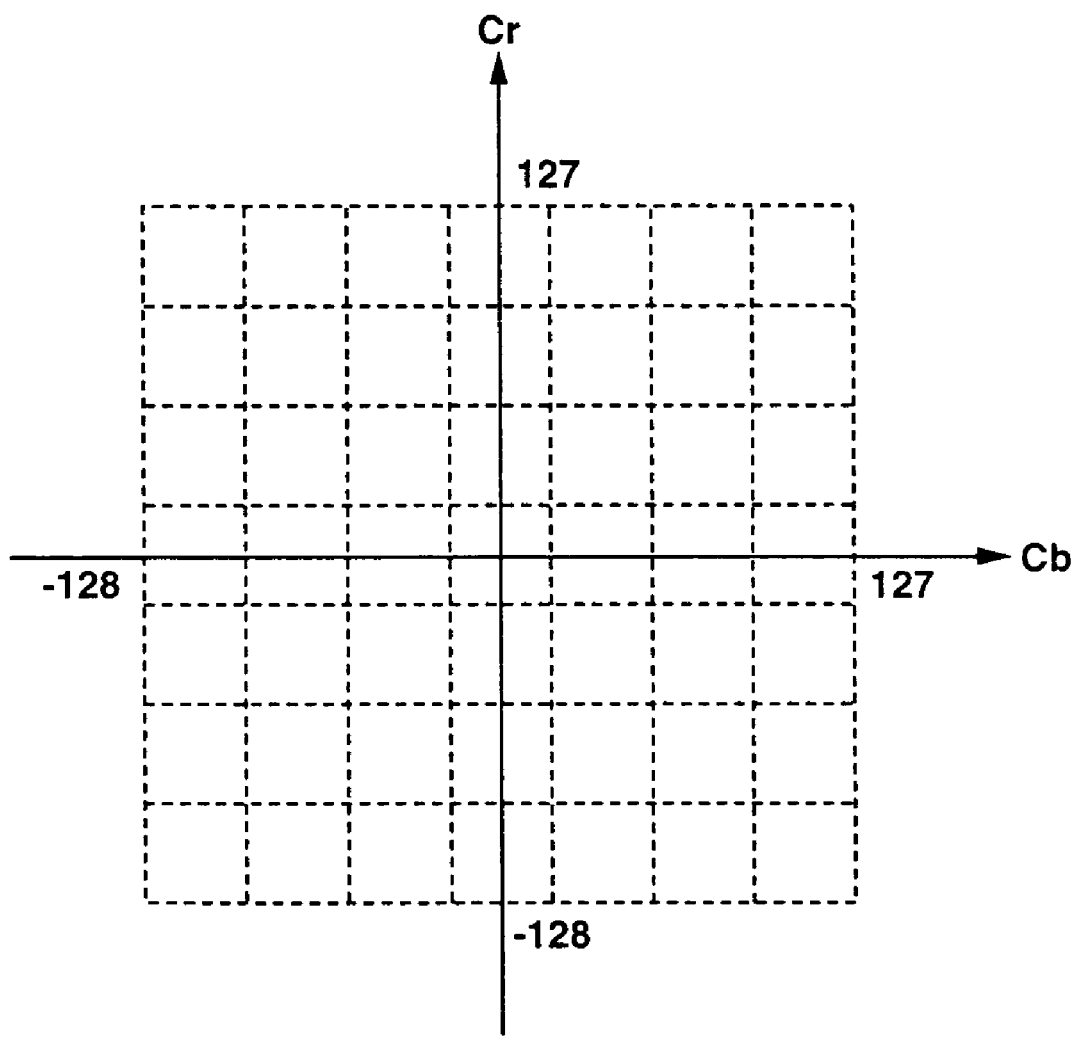

The present embodiment uses the division shown in FIG. 17. Another number of blocks such as 16×16 can also be used. Dividing the color space into blocks using the origin at the center can also be used as shown in FIG. 18.

When the formation of the two-dimensional histogram of one frame is finished, the table forming unit 32 obtains table data for calculation of the degree of color shift from the two-dimensional histogram formed through the histogram forming unit 31, and then writes the obtained data to the LUT 33.

First, a counter value of a block corresponding to (Cr, Cb)=(0, 0) is read out. The degree of color shift is determined in accordance with the image size (the number of pixels of one field) of image data. The determined degree is written as table data for calculation of the degree of color shift to the LUT 33 at an address "000000".

Since the method for converting a counter value of each block into the degree of color shift is the same as that of the first embodiment, the description regarding the method is omitted.

In a manner similar to the first embodiment, counter values of 64 blocks corresponding to (Cr, Cb)=(0, 0) to (7, 7) in total are read out. The degree of color shift is written to the LUT 33 at an address "000000" in which a value of Cr is assigned to the most significant bit and a value of Cb is assigned to the least significant bit, thus completely forming the LUT 33 as a color shift degree calculation table.

The color signals of the image data supplied from the memory 4 are input to the LUT 33 functioning as the color shift degree calculation table, the color signals being obtained by converting the image data through the RGB-YC matrix circuit 30. The degree of color shift of the corresponding block in the CrCb color space is read every pixel.

The read degrees are output to the LPF 15 to smooth the degree of color shift in the same way as the first embodiment.

Since the operation and function of the LPF 15 are the same as those of the LPF 15 in the first embodiment, the description thereof is omitted.

The operation of the image data estimating unit 26 will now be described.

Figure 8:
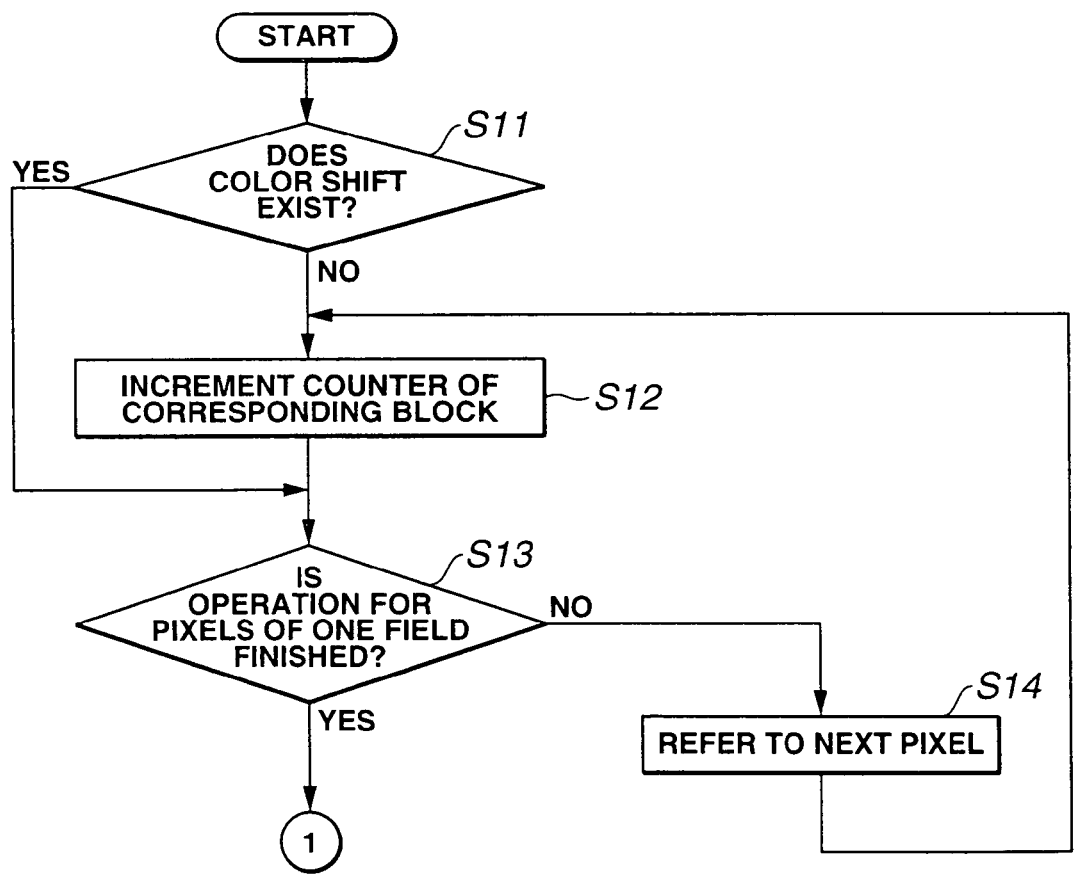

Since the operation and function of the histogram forming unit 16 are the same as those of the unit 16 in the first embodiment, the description thereof is omitted (refer to FIG. 8).

Figure 19:
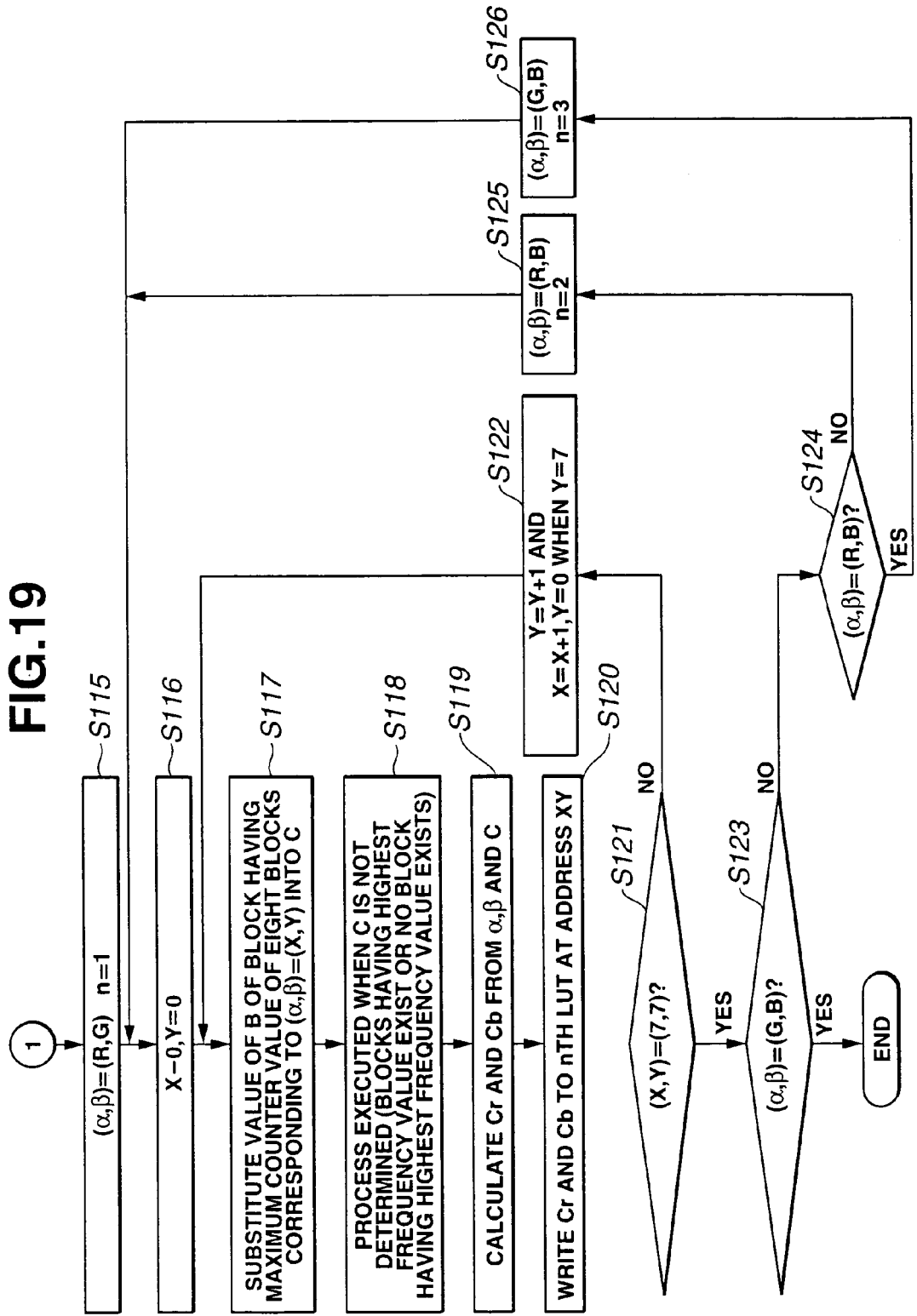

The table forming unit 34 forms table data from the formed three-dimensional histogram of one field in steps S115 to 126 of FIG. 19 and writes the table data to the first to third LUTs 35a to 35c. When the formation of the three-dimensional histogram of one field is completed, the table forming unit 34 refers to counter values of eight blocks included in a group of blocks corresponding to (R, G)=(0, 0) to determine a value of B of the block having the highest frequency value in the same way as the first embodiment.

The present embodiment differs from the first embodiment in estimated color data written in the first LUT 35a. According to the present embodiment, the table forming unit 34 calculates Cr and Cb from (R, G, B)=(0, 0) (value of the block having the highest frequency value) obtained as mentioned above and then writes Cr and Cb as estimated color data to the first LUT 35a at the address "000000". The similar operation is sequentially performed to block groups corresponding to (R, G)=(0, 0) to (7, 7), namely, the operation is repeated 64 times to determine estimated color data to be written to the first LUT 35a at the addresses "000000" to "111111" and write the data.

In this instance, when the counter values of eight blocks, used in determining the highest frequency value, indicate zero, mean color signals $\overline{Cr_{AVG}}$ and $\overline{Cb_{AVG}}$ of original input image data are obtained. The values of the signals are determined as estimated color data. When there are a plurality of blocks having the highest frequency value, the operation similar to that of the first embodiment is performed. Accordingly, the description of the similar operation is omitted.

In each of the first to third LUTs 35a to 35c, in the same way as the first embodiment, an address is formed to read out the estimated color data Cr and Cb. The read data is output as an estimated image to the color shift reducing unit 27.

The operation of the color shift reducing unit 27 will now be described.

The coefficient determining unit 19, the multiplying units 20, and the adding unit 21 differ from those of the first embodiment in that Cr and Cb are used as data to be operated instead of R, G, and B. However, the operations of these units are the same as those of the first embodiment. Accordingly, the description thereof is omitted.

The combining unit 36 combines correction image data output from the adding unit 21 and the image data output from the memory 4 on the basis of the color shift degree data generated from the color shift degree calculating unit 25.

Since the correction image data output from the adding unit 21 include color signals Cr and Cb, the color signals Cr and Cb are calculated from the RGB image data output from the memory 4 and the respective color signals are combined on the basis of the color shift degree data. Since the combining method is the same as that in the first embodiment, the description thereof is omitted. The combined color signals Cr and Cb are converted together with the brightness signal Y output from the RGB image data generated from the memory 4 into RGB image data using the following expressions (7) to (9).

$$R = Y + 1.402 \times Cr \quad (7)$$

$$G = Y - 0.714 \times Cr - 0.344 \times Cb \quad (8)$$

$$B = Y + 1.772 \times Cb \quad (9)$$

The color shift reducing apparatus constructed as mentioned above can perform a color shift reducing process to a dark image having low saturation with higher accuracy than the color shift reducing apparatus according to the first embodiment.

Third Embodiment

Figure 20:
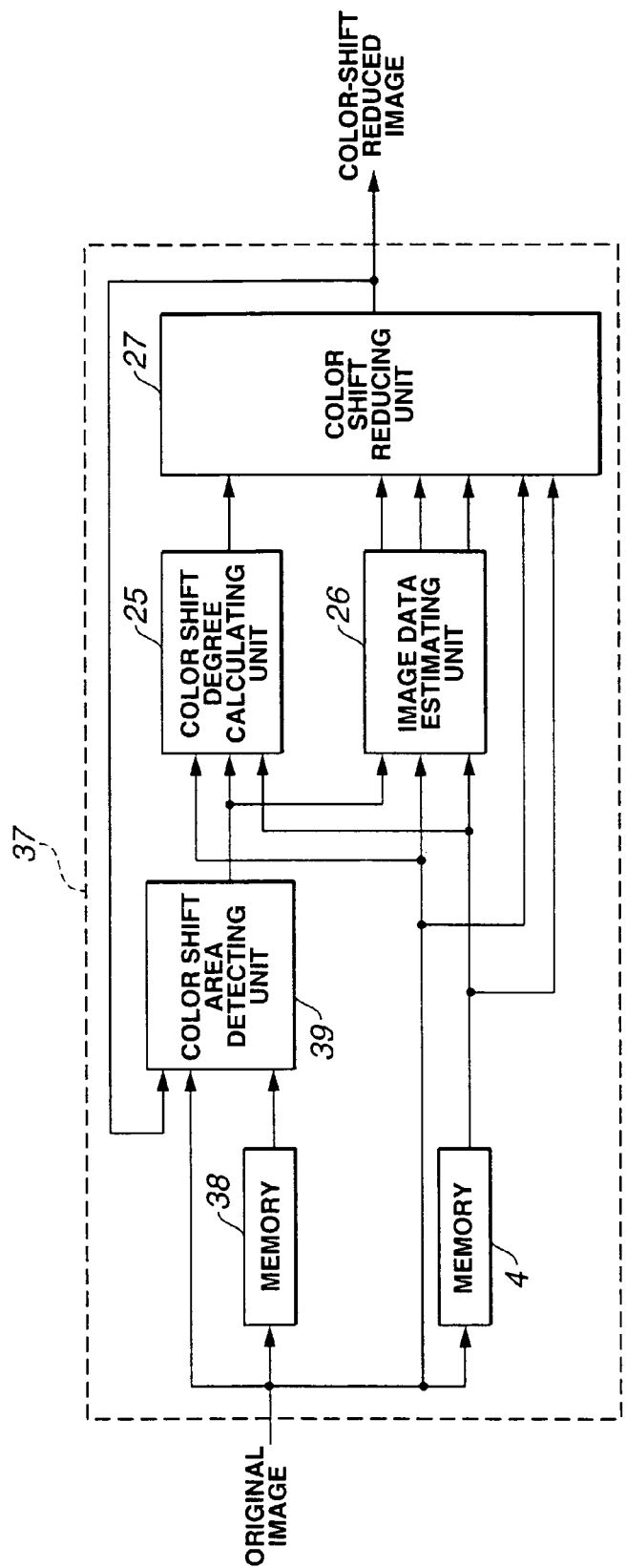
FIGS. 20 and 21 relate to a third embodiment of the present invention, FIG. 20 being a block diagram of the structure of a color shift reducing apparatus, FIG. 21 being a block diagram of the structure of a color shift area detecting unit in FIG. 20.

Referring to FIG. 20, a color shift reducing apparatus 37 according to the present embodiment comprises: a memory 38 for delaying an input image by one field; and a color shift area detecting unit 39 for detecting color shift on the basis of the image data delayed by one field, the data being supplied from the memory 38, the input image data of the color shift reducing apparatus 37, and a color shift reduced-image output from the color shift reducing unit 27. The other components are the same as those in the color shift reducing apparatus according to the second embodiment. A difference between the construction of the apparatus according to the third embodiment and that according to the second embodiment will now be described. The same components are designated by the same reference numerals to omit the description thereof.

Figure 21:
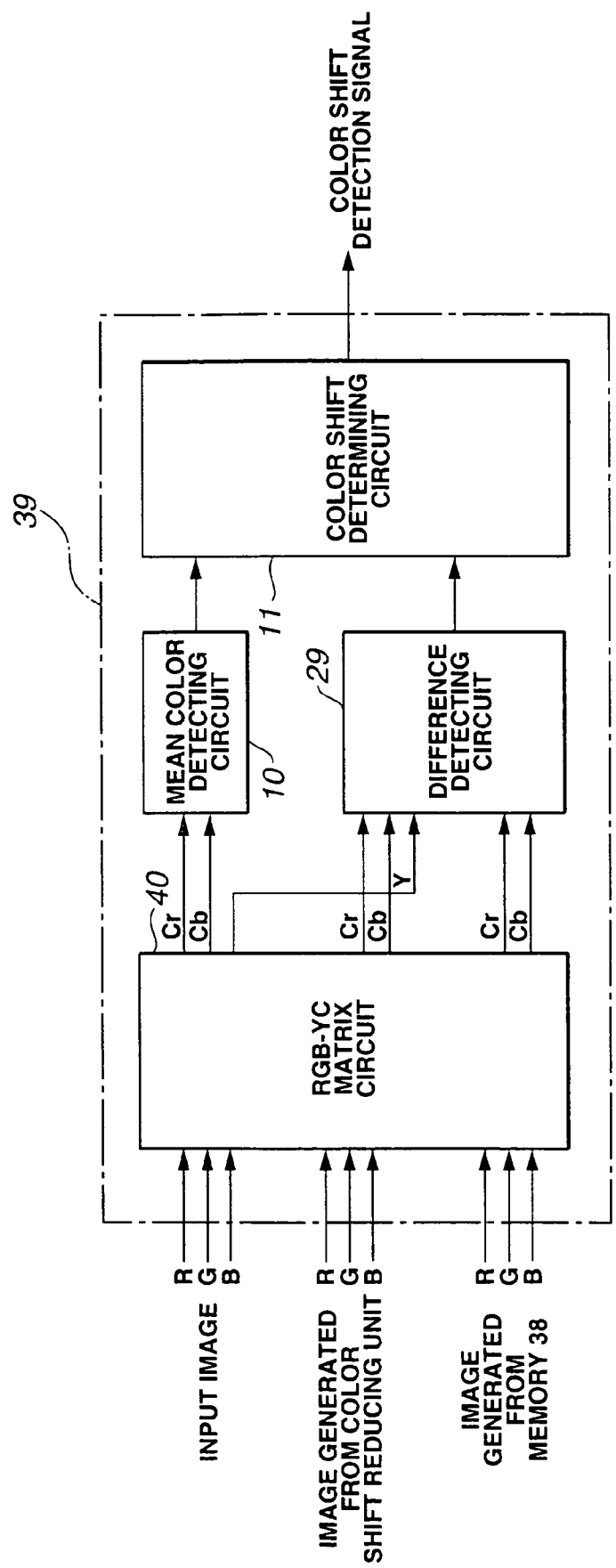

Referring to FIG. 21, the color shift area detecting unit 38 comprises an RGB-YC matrix circuit 40 for calculating color signals Cr and Cb and a brightness signal Y from the input RGB image data, the image data delayed through the memory 38, and the color shift reduced image data obtained through the color shift reducing unit 27. Since the other components are the same as those in the second embodiment, the description thereof is omitted.

The operation of the color shift reducing apparatus constructed as mentioned above will now be described.

The image data supplied to the color shift reducing apparatus is delayed by one field through the memory 38 and is then output to the color shift area detecting unit 39. In the RGB-YC matrix circuit 40 of the color shift area detecting unit 39, in the same way as the second embodiment, the color signals Cr and Cb of the image data supplied to the color shift reducing apparatus and color signals Crp and Cbp of the color shift reduced image generated from the color shift reducing unit 27 are calculated. In addition, color signals Crn and Cbn of the image data output from the memory 38 and the brightness signal Y of the input image data are calculated.

The color signals Cr and Cb of the image data supplied to the color shift reducing apparatus are output to the mean color detecting circuit 10. The other color signals Crn, Cbn, Crp, and Cbp and the brightness signal Y are output to the difference detecting circuit 29. The signals are processed in the same way as the second embodiment.

The operations and functions of the other components are the same as those of the second embodiment. Accordingly, the description thereof is omitted.

According to the second embodiment, the timing of a mean value $\overline{Y_{AVG}}$ of the mean color or the brightness signal is delayed by one field. According to the present embodiment, this timing matches the timing of an image which is actually processed, thus providing a color shift reduced image having advantages over those of the second embodiment.

According to the present embodiment, the image data supplied to the color shift reducing apparatus is input to the memory 38 and is then delayed by one field. Supplying and delaying the color shift reduced image output from the color shift reducing unit 27 provides similar advantages.

In the present invention, it is apparent that different embodiments in a wide range can be formed on the basis of this invention without departing from the spirit and scope of the invention. This invention is restricted to the appended claims but not be limited to any particular embodiment.

INDUSTRIAL APPLICABILITY

As mentioned above, the color shift reducing apparatus according to the present invention is effectively used to estimate a correction color with high accuracy when two or more pigments exist in a living body.

The invention claimed is:

1. A color shift reducing apparatus comprising:

a color shift area detecting unit for detecting an area with color shift in a first image on the basis of a first image signal indicating the first image and a second image signal indicating a second image, the first and second images being obtained by imaging a subject through a field-sequential imaging device;

a color component signal estimating unit for estimating a color component signal on the basis of the other color component signals included in an area of the first image signal, the area excluding the color shift area detected through the color shift area detecting unit, the other color component signals being first and second color component signals, the color component signal being a third color component signal; and a color shift reducing unit for forming a color shift reduced image on the basis of the first image signal and image signals based on the first and second color component signals and the third color component signal which is obtained through the color component signal estimating unit.

2. The color shift reducing apparatus according to claim 1, wherein the color shift reducing unit comprises:

three estimated-color-image forming units for forming estimated color images on the basis of the three color component signals obtained through the color component signal estimating unit, respectively;

a color shift corrected image forming unit for combining the three estimated color images output from the three estimated-color-image forming units to form a color shift corrected image; and a color shift reduced image forming unit for combining the color shift corrected image formed through the color shift corrected image forming unit and the first image signal to form a color shift reduced image.

3. The color shift reducing apparatus according to claim 2, wherein the color shift corrected image forming unit determines the combination ratio of the three estimated color images on the basis of information related to distribution of the respective color component signals of the first image signal.

4. The color shift reducing apparatus according to claim 1, wherein when it is impossible to estimate one color component signal on the basis of the other two color component signals of the three color component signals in the area excluding the color shift area detected through the color shift area detecting unit, the color component signal estimating unit estimates the one color component signal on the basis of a mean value of data of one field in the first image signal.

5. A color shift reducing apparatus comprising:

color shift area detecting means for detecting an area with color shift in a first image on the basis of a first image signal indicating the first image and a second image signal indicating a second image, the first and second images being obtained by imaging a subject through a field-sequential imaging device;

color component signal estimating means for estimating a color component signal on the basis of the other color component signals included in an area of the first image signal, the area excluding the color shift area detected through the color shift area detecting means, the other color component signals being first and second color component signals, the color component signal being a third color component signal; and color shift reducing means for forming a color shift reduced image on the basis of the first image signal and image signals based on the first and second color component signals and the third color component signal, which is obtained through the color component signal estimating means.

* * * * *